United States Patent
Aggarwal et al.

(10) Patent No.: US 12,470,549 B2
(45) Date of Patent: Nov. 11, 2025

(54) AUTHORIZED MACHINE LEARNING MODEL RETRIEVAL FOR A COMMUNICATIONS NETWORK

(71) Applicant: Nokia Technologies Oy, Espoo (FI)

(72) Inventors: Chaitanya Aggarwal, Munich (DE); Saurabh Khare, Bangalore (IN); German Peinado Gomez, Warsaw (PL); Gerald Kunzmann, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 197 days.

(21) Appl. No.: 18/306,434

(22) Filed: Apr. 25, 2023

(65) Prior Publication Data

US 2023/0353561 A1    Nov. 2, 2023

(30) Foreign Application Priority Data

Apr. 27, 2022 (IN) .............................. 202241024737

(51) Int. Cl.
*H04L 9/40* (2022.01)
*G06N 20/00* (2019.01)

(52) U.S. Cl.
CPC ......... *H04L 63/0853* (2013.01); *G06N 20/00* (2019.01)

(58) Field of Classification Search
CPC ............................ H04L 63/0853; G06N 20/00
See application file for complete search history.

(56) References Cited

U.S. PATENT DOCUMENTS

| | | | |
|---|---|---|---|
| 2021/0152543 A1* | 5/2021 | Doshi | G06N 20/00 |
| 2021/0288802 A1 | 9/2021 | Muhanna et al. | |
| 2022/0108214 A1 | 4/2022 | Lee et al. | |

(Continued)

FOREIGN PATENT DOCUMENTS

| | | |
|---|---|---|
| KR | 20220021438 A | 2/2022 |
| WO | 2021/023388 A1 | 2/2021 |

OTHER PUBLICATIONS

"3rd Generation Partnership Project; Technical Specification Group Services and System Aspects; Security architecture and procedures for 5G system (Release 17)", 3GPP TS 33.501, V17.5.0, Mar. 2022, pp. 1-293.

(Continued)

*Primary Examiner* — Anthony D Brown
*Assistant Examiner* — Kamryn J. Gillespie
(74) *Attorney, Agent, or Firm* — SQUIRE PATTON BOGGS (US) LLP

(57) ABSTRACT

Methods, systems, apparatuses, and computer program products are provided for authorized machine learning model retrieval for a communications network. In this regard, an access token request for one or more machine learning models related to a communications network is received from a network function service consumer (NFc). The access token request includes information to identify the one or more machine learning models. The NFc is then authorized with respect to the one or more machine learning models based on the information included in the access token request. Additionally, enhanced an access token for retrieving the one or more machine learning models is provided to the NFc based on valid authorization of the NFc with respect to the one or more machine learning models.

12 Claims, 11 Drawing Sheets

(56) References Cited

U.S. PATENT DOCUMENTS

| | | | |
|---|---|---|---|
| 2022/0272537 A1 | 8/2022 | Aggarwal et al. | |
| 2022/0353802 A1* | 11/2022 | Gupta | H04W 60/04 |
| 2022/0360584 A1 | 11/2022 | Kunzmann et al. | |
| 2023/0254719 A1* | 8/2023 | Kim | G06N 20/00 |
| | | | 370/252 |
| 2024/0064211 A1* | 2/2024 | Karapantelakis | H04W 48/18 |
| 2024/0298194 A1* | 9/2024 | Mueck | G06N 20/00 |
| 2024/0422660 A1* | 12/2024 | Bartolome Rodrigo | |
| | | | H04W 48/18 |

OTHER PUBLICATIONS

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"3rd Generation Partnership Project; Technical Specification Group Services and System Aspects; Study of Enablers for Network Automation for 5G System (5GS); Phase 3 (Release 18)", 3GPP TR 23.700-81, V0.1.0, Mar. 2022, pp. 1-14.

"3rd Generation Partnership Project; Technical Specification Group Core Network and Terminals; 5G System; Network Function Repository Services; Stage 3 (Release 17)", 3GPP TS 29.510, V17.5.0, Mar. 2022, pp. 1-298.

"ENA: Coclusion to key issue #3.3", 3GPP TSG-SA3 Meeting #104-e, S3-212659, Agenda: 5.16, Huawei, Aug. 16-27, 2021, 2 pages.

"KI on Ensuring restrictive transfer of ML models between authorized NWDAF Instances", 3GPP TSG-SA3 Meeting #102Bis-e, S3-211237, Agenda: 5.16, Nokia, Mar. 1-5, 2021, 1 page.

"3rd Generation Partnership Project; Technical Specification Group Services and System Aspects; System architecture for the 5G System (5GS); Stage 2 (Release 17)", 3GPP TS 23.501, V17.1.0, Apr. 2021, pp. 1-506.

Extended European Search Report received for corresponding European Patent Application No. 23169363.1, dated Sep. 22, 2023, 11 pages.

"Editorial Notes Removal for Solution 10 to address authorization mechanisms when data is sent via MFAF", 3GPP TSG-SA3 Meeting #104-e, S3-213041, Agenda: 5.16, Nokia, Aug. 16-27, 2021, 6 pages.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.8.0, Nov. 2021, pp. 1-50.

European Communication pursuant to Article 94(3) EPC, corresponding to EP Application No. 23 169 363.1, dated May 30, 2025.

* cited by examiner

700

| Attribute name | Description |
|---|---|
| grant_type | This IE shall contain the grant type as "client_credentials" |
| nfInstanceId | This IE shall contain the NF instance id of the NF service consumer. |
| nfType | This IE shall be included when the access token request is for an NF type and not for a specific NF / NF service instance. When present, this IE shall contain the NF type of the NF service consumer. |
| targetNfType | This IE shall be included when the access token request is for an NF type and not for a specific NF / NF service instance. When present, this IE shall contain the NF type of the NF service producer. |
| Scope | This IE shall contain the NF service name(s) of the NF service producer(s), separated by whitespaces, as described in IETF RFC 6749 [16], section 3.3.<br><br>The service name(s) included in this attribute shall be any of the services defined in the ServiceName enumerated type (see subclause 6.1.6.3.11).<br><br>pattern: '^([a-zA-Z0-9_-]+)( [a-zA-Z0-9_-]+)*$' |
| targetNfInstanceId | This IE shall be included, if available and if it is an access token request for a specific NF Service Producer. When present this IE shall contain the NF Instance ID of the specific NF Service Producer for which the access token is requested. |
| requesterPlmn | This IE shall be included when the NF service consumer in one PLMN requests a service access authorization for an NF service producer from a different PLMN.<br>When present, this IE shall contain the PLMN ID of the requester NF service consumer. |
| targetSnssaiList | This IE may be included during an access token request for an NF type and not for a specific NF / NF service instance. When present, this IE shall contain the list of S-NSSAIs of the NF Service Producer. |
| targetNsiList | This IE may be included during an access token request for an NF type and not for a specific NF / NF service instance. When present, this IE shall contain the list of NSIs of the NF Service Producer. |
| targetNfSetId | This IE may be included during an access token request for an NF type and not for a specific NF / NF service instance. When present, this IE shall contain the NF Set ID of the NF Service Producer. |
| AnalyticsId 702 | This IE shall be included when the NF service wants to access a particular analytics(s) belonging to a NF Service Producer. |
| modelID 704 | This IE shall be included when the NF service wants to access a particular model(s) belonging to a NF Service Producer. |
| modelVersion 706 | This IE shall be included when the NF service consumer wants to access a particular version of the model (if already known to the consumer) |

| Attribute name | Description |
|---|---|
| Iss | This IE shall contain NF instance id of the NRF., corresponding to the standard "Issuer" claim described in IETF RFC 7519 [25], section 4.1.1 |
| Sub | This IE shall contain the NF instance ID of the NF service consumer, corresponding to the standard "Subject" claim described in IETF RFC 7519 [25], section 4.1.2. |
| Aud | This IE shall contain the NF service producer's NF instance ID(s) (if the exact NF instance(s) of the NF service producer is known) or the NF type of NF service producers for which the claim is applicable, corresponding to the standard "Audience" claim described in IETF RFC 7519 [25], section 4.1.3. |
| scope | This IE shall contain the name of the NF services for which the access_token is authorized for use; this claim corresponds to a private claim, as described in IETF RFC 7519 [25], section 4.3.<br><br>pattern: '^([a-zA-Z0-9_-]+)( [a-zA-Z0-9_-]+)*$' |
| exp | This IE shall contain the number of seconds after which the access_token is considered to be expired, corresponding to the standard "Expiration Time" claim described in IETF RFC 7519 [25], section 4.1.4. |
| Model ID 802 | This IE shall be included if the NRF has verified that the NFc is authorized to retrieve a particular ML model id which is hosted/provided by a NF Service Producer. If an NF service producer that receives this IE in the token included in the authorization header does not understand this IE, it shall be ignored. |
| Analytics Id 804 | This IE shall be included if the NRF has verified that the NFc is authorized to retrieve a particular ML model analytics id which is hosted/provided by a NF Service Producer. If an NF service producer that receives this IE in the token included in the authorization header does not understand this IE, it shall be ignored. |

FIG. 8

AUTHORIZED MACHINE LEARNING MODEL RETRIEVAL FOR A COMMUNICATIONS NETWORK

TECHNOLOGICAL FIELD

An example embodiment of the present disclosure generally relates to communication systems and, more particularly, to security architectures and/or procedures for a communications network.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, with a communication network and one or more compatible communication devices. Communication systems continue to evolve to extend the flexibility in the network usage, to provide improved security, and/or to provide users with improved network services. For instance, fourth generation (4G) wireless mobile telecommunications technology, also known as Long Term Evolution (LTE) technology, was designed to provide high-capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) has developed standards for 5G technology, including standards for next generation radio access networks and 5G network architectures that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Additionally, the 5G network has been designed as a Service Based Architecture (SBA), e.g., a system architecture in which the system functionality is achieved by a set of NFs providing services to other authorized NFs to access their services. The 5G network allows for the support of NFs via a Network Repository Function (NRF). For example, an NRF can maintain a list of available NFs to facilitate service registration and/or discovery in an instance in which a UE attempts to access one or more services provided by one or more network devices. To facilitate a communication session, network data analytics services can be provided via a communication system. For example, multiple network data analytics functions (NWDAFs) can be deployed to provide analytics data for data consumers. However, network data analytics services can often be inefficient and/or often result in data consumers not receiving data for some analytics identifications or areas of interest, among other deficiencies.

BRIEF SUMMARY

Methods, apparatuses and computer program products are provided in accordance with example embodiments to provide for authorized machine learning model retrieval for a communications network.

In an example embodiment, a method is provided. The method comprises receiving, from a network function service consumer, NFc, an access token request for one or more machine learning models related to a communications network, the access token request comprising information to identify the one or more machine learning models. The method also comprises authorizing the NFc with respect to the one or more machine learning models based on the information included in the access token request. The method also comprises providing an enhanced access token for retrieving the one or more machine learning models to the NFc based on valid authorization of the NFc with respect to the one or more machine learning models.

In some embodiments, the information to identify the one or more machine learning models comprises at least a model identifier for the one or more machine learning models, and in some embodiments the method comprises authorizing the NFc with respect to the one or more machine learning models based at least on the model identifier.

In some embodiments, the information to identify the one or more machine learning models comprises at least a model version identifier for the one or more machine learning models, and in some embodiments the method comprises authorizing the NFc with respect to the one or more machine learning models based at least on the model identifier and the model version identifier.

In some embodiments, the information to identify the one or more machine learning models comprises at least an analytics identifier for a type of analytics supported by the one or more machine learning models, and in some embodiments the method comprises authorizing the NFc with respect to the one or more machine learning models based at least on the analytics identifier.

In some embodiments, the information to identify the one or more machine learning models comprises at least an NF type for one or more NFs authorized to retrieve the one or more models, and in some embodiments the method comprises authorizing the NFc with respect to the one or more machine learning models based at least on the NF type.

In some embodiments, the information to identify the one or more machine learning models comprises at least an NF instance/NF set identifier for one or more NFs authorized to retrieve the one or more models, and in some embodiments the method comprises authorizing the NFc with respect to the one or more machine learning models based at least on the NF instance/NF set identifier.

In some embodiments, the information to identify the one or more machine learning models comprises at least an NF vendor identifier for one or more NFs authorized to retrieve the one or more models, and in some embodiments the method comprises authorizing the NFc with respect to the one or more machine learning models based at least on the NF vendor identifier.

In some embodiments, the method comprises configuring the access token with one or more machine learning model identifiers in response to the valid authorization of the NFc with respect to the one or more machine learning models.

In some embodiments, the method comprises authorizing the NFc based on credential information associated with the NFc.

In some embodiments, the method comprises determining whether the NFc corresponds to a particular NFc included in a list of NFc types.

In some embodiments, the method comprises authorizing the NFc based on a network function, NF, profile for the NFc that is stored in a Network Repository Function, NRF.

In some embodiments, the method comprises receiving, from a network function service producer, NFp, a registration request associated with an updated network function, NF, profile for the NFc that comprises at least one of a model identifier for the one or more machine learning models, an analytics identifier for a type of analytics supported by the one or more machine learning models, an NF type for one or more NFs authorized to retrieve the one or more models, or an NF instance/NF set identifier for one or more NFs authorized to retrieve the one or more models.

In some embodiments, the access token request is an OAuth 2.0 access token. In some embodiments, the enhanced access token is an OAuth 2.0 access token. In some embodiments, the enhanced access token is an OAuth 2.0 access token received as an access token request, enhanced with additional information elements.

In another example embodiment, an apparatus includes processing circuitry and at least one memory including computer program code instructions that are configured to, when executed by the processing circuitry, cause the apparatus to receive, from a network function service consumer, NFc, an access token request for one or more machine learning models related to a communications network, the access token request comprising information to identify the one or more machine learning models. In some embodiments, the computer program code instructions are also configured to, when executed by the processing circuitry, cause the apparatus to authorize the NFc with respect to the one or more machine learning models based on the information included in the access token request. In some embodiments, the computer program code instructions are also configured to, when executed by the processing circuitry, cause the apparatus to provide an enhanced access token for retrieving the one or more machine learning models to the NFc based on valid authorization of the NFc with respect to the one or more machine learning models.

In some embodiments, the information to identify the one or more machine learning models comprises at least a model identifier for the one or more machine learning models and the computer program code instructions are also configured to, when executed by the processing circuitry, cause the apparatus to authorize the NFc with respect to the one or more machine learning models based at least on the model identifier.

In some embodiments, the information to identify the one or more machine learning models comprises an analytics identifier for a type of analytics supported by the one or more machine learning models and the computer program code instructions are also configured to, when executed by the processing circuitry, cause the apparatus to authorize the NFc with respect to the one or more machine learning models based at least on the analytics identifier.

In some embodiments, the information to identify the one or more machine learning models comprises at least a model version identifier for the one or more machine learning models and the computer program code instructions are also configured to, when executed by the processing circuitry, cause the apparatus to authorize the NFc with respect to the one or more machine learning models based at least on the model version identifier.

In some embodiments, the information to identify the one or more machine learning models comprises at least at least an NF type for one or more NFs authorized to retrieve the one or more models and the computer program code instructions are also configured to, when executed by the processing circuitry, cause the apparatus to authorize the NFc with respect to the one or more machine learning models based at least on the NF type.

In some embodiments, the information to identify the one or more machine learning models comprises at least an NF instance/NF set identifier for one or more NFs authorized to retrieve the one or more models and the computer program code instructions are also configured to, when executed by the processing circuitry, cause the apparatus to authorize the NFc with respect to the one or more machine learning models based at least on the NF instance/NF set identifier.

In some embodiments, the information to identify the one or more machine learning models comprises at least an NF vendor identifier for one or more NFs authorized to retrieve the one or more models and the computer program code instructions are also configured to, when executed by the processing circuitry, cause the apparatus to authorize the NFc with respect to the one or more machine learning models based at least on the NF vendor identifier.

In some embodiments, the computer program code instructions are also configured to, when executed by the processing circuitry, cause the apparatus to register respective metadata for the one or more machine learning models in a network function, NF, profile for the NFc based on the model identifier.

In some embodiments, the computer program code instructions are also configured to, when executed by the processing circuitry, cause the apparatus to configure the access token with one or more machine learning model identifiers in response to the valid authorization of the NFc with respect to the one or more machine learning models.

In some embodiments, the computer program code instructions are also configured to, when executed by the processing circuitry, cause the apparatus to authorize the NFc based on credential information associated with the NFc.

In some embodiments, the computer program code instructions are also configured to, when executed by the processing circuitry, cause the apparatus to determine whether the NFc corresponds to a particular NFc included in a list of NFc types.

In some embodiments, the computer program code instructions are also configured to, when executed by the processing circuitry, cause the apparatus to authorize the NFc based on a network function, NF, profile for the NFc that is stored in a Network Repository Function, NRF.

In some embodiments, the computer program code instructions are also configured to, when executed by the processing circuitry, cause the apparatus to receive, from a network function service producer, NFp, a registration request associated with an updated network function, NF, profile for the NFc that comprises at least one of a model identifier for the one or more machine learning models, an analytics identifier for a type of analytics supported by the one or more machine learning models, an NF type for one or more NFs authorized to retrieve the one or more models, or an NF instance/NF set identifier for one or more NFs authorized to retrieve the one or more models.

In some embodiments, the access token request is an OAuth 2.0 access token. In some embodiments, the enhanced access token is an OAuth 2.0 access token. In some embodiments, the enhanced access token is an OAuth 2.0 access token received as an access token request, enhanced with additional information elements.

In another example embodiment, a computer program product is provided. The computer program product includes at least one non-transitory computer readable storage medium having computer-executable program code instructions stored therein with the computer-executable program code instructions including program code instructions configured, upon execution, to receive, from a network function service consumer, NFc, an access token request for one or more machine learning models related to a communications network, the access token request comprising information to identify the one or more machine learning models. In some embodiments, the computer-executable program code instructions are also configured to authorize the NFc with respect to the one or more machine learning models based on the information included in the access token request. In some embodiments, the computer-executable program code instructions are also configured to provide an enhanced access token for retrieving the one or more machine learning models to the NFc based on valid authorization of the NFc with respect to the one or more machine learning models.

In yet another example embodiment, an apparatus is provided that includes means for receiving, from a network function service consumer, NFc, an access token request for one or more machine learning models related to a communications network, the access token request comprising information to identify the one or more machine learning models. In some embodiments, the apparatus of this example embodiment also includes means for authorizing the NFc with respect to the one or more machine learning models based on the information included in the access token request. In some embodiments, the apparatus of this example embodiment also includes means for providing an enhanced access token for retrieving the one or more machine learning models to the NFc based on valid authorization of the NFc with respect to the one or more machine learning models.

In another example embodiment, a method is provided. The method comprises transmitting, to a network entity, a service request token for one or more machine learning models related to a communications network, the service request token comprising information to identify the one or more machine learning models. The method also comprises in response to authorization with respect to the one or more machine learning models based at least on the information included in the service request token, receiving a service request token response for retrieving the one or more machine learning models.

In some embodiments, the service request token response comprises a uniform resource identifier, URI, for retrieving the one or more machine learning models associated with the service request token.

In some embodiments, the network entity is an Analytics Data Repository Function, ADRF, and the method further comprises transmitting the service request token to the ADRF and/or receiving the service request token response from the ADRF.

In some embodiments, the network entity is a network function service producer, NFp, and the method further comprises transmitting the service request token to the NFp and/or receiving the service request token response from the NFp.

In some embodiments, the information to identify the one or more machine learning models comprising at least a model identifier for the one or more machine learning models, and the method comprises receiving the service request token response in response to authorization with respect to the one or more machine learning models based at least on the model identifier.

In some embodiments, the information to identify the one or more machine learning models comprising at least a model version identifier for the one or more machine learning models, and the method comprises receiving the service request token response in response to authorization with respect to the one or more machine learning models based at least on the model version identifier.

In some embodiments, the information to identify the one or more machine learning models comprising at least an analytics identifier for a type of analytics supported by the one or more machine learning models, and the method comprises receiving the service request token response in response to authorization with respect to the one or more machine learning models based at least on the analytics identifier.

In some embodiments, the method further comprises retrieving the one or more machine learning models from an Analytics Data Repository Function, ADRF. In some embodiments, the method further comprises retrieving the one or more machine learning models from a network function service producer, NFp. In some embodiments, a transfer protocol such as hypertext transfer protocol (HTTP), hypertext transfer protocol secure (HTTPS), HTTP/2, HTTP/3, quick user datagram protocol internet connection (QUIC), software package data exchange (SPDY), file transfer protocol (FTP), secure file transfer protocol (SFTP), file transfer with explicit SSL (FTPES), or secure copy protocol (SCP) is used for the retrieval of the one or more machine learning models.

In some embodiments, the method further comprises transmitting credential information associated with a network function service consumer, NFc, to the network entity or a different network entity.

In another example embodiment, an apparatus includes processing circuitry and at least one memory including computer program code instructions that are configured to, when executed by the processing circuitry, cause the apparatus to transmit, to a network entity, a service request token for one or more machine learning models related to a communications network, the service request token comprising information to identify the one or more machine learning models. In some embodiments, the computer program code instructions are also configured to, when executed by the processing circuitry, cause the apparatus to, in response to authorization with respect to the one or more machine learning models based at least on the information included in the service request token, receive a service request token response for retrieving the one or more machine learning models.

In some embodiments, the service request token response comprises a uniform resource identifier, URI, for retrieving the one or more machine learning models associated with the service request token.

In some embodiments, the network entity is an Analytics Data Repository Function, ADRF, and the computer program code instructions are also configured to, when executed by the processing circuitry, cause the apparatus to transmit the service request token to the ADRF and/or receive the service request token response from the ADRF.

In some embodiments, the network entity is a network function service producer, NFp, and the computer program code instructions are also configured to, when executed by the processing circuitry, cause the apparatus to transmit the service request token to the NFp and/or receive the service request token response from the NFp.

In some embodiments, the information to identify the one or more machine learning models comprises at least a model identifier for the one or more machine learning models, and the computer program code instructions are also configured to, when executed by the processing circuitry, cause the apparatus to receive the service request token response in response to authorization with respect to the one or more machine learning models based at least on the model identifier.

In some embodiments, the information to identify the one or more machine learning models comprises at least a model version identifier for the one or more machine learning models, and the computer program code instructions are also configured to, when executed by the processing circuitry, cause the apparatus to receive the service request token response in response to authorization with respect to the one or more machine learning models based at least on the model version identifier.

In some embodiments, the information to identify the one or more machine learning models comprises at least an analytics identifier for a type of analytics supported by the one or more machine learning models, and the computer program code instructions are also configured to, when executed by the processing circuitry, cause the apparatus to receive the service request token response in response to authorization with respect to the one or more machine learning models based at least on the analytics identifier.

In some embodiments, the computer program code instructions are also configured to, when executed by the processing circuitry, cause the apparatus to retrieve the one or more machine learning models from an Analytics Data Repository Function, ADRF. In some embodiments, the computer program code instructions are also configured to, when executed by the processing circuitry, cause the apparatus to retrieve the one or more machine learning models from a network function service producer, NFp.

In some embodiments, the computer program code instructions are also configured to, when executed by the processing circuitry, cause the apparatus to transmit credential information associated with a network function service consumer, NFc, to the network entity or a different network entity.

In another example embodiment, a computer program product is provided. The computer program product includes at least one non-transitory computer readable storage medium having computer-executable program code instructions stored therein with the computer-executable program code instructions including program code instructions configured, upon execution, to transmit, to a network entity, a service request token for one or more machine learning models related to a communications network, the service request token comprising information to identify the one or more machine learning models. In some embodiments, the computer-executable program code instructions are also configured to, in response to authorization with respect to the one or more machine learning models based at least on the information included in the service request token, receive a service request token response for retrieving the one or more machine learning models.

In yet another example embodiment, an apparatus is provided that includes means for transmitting, to a network entity, a service request token for one or more machine learning models related to a communications network, the service request token comprising information to identify the one or more machine learning models. In some embodiments, the apparatus of this example embodiment also includes, in response to authorization with respect to the one or more machine learning models based at least on the information included in the service request token, means for receiving a service request token response for retrieving the one or more machine learning models.

In another example embodiment, a method is provided. The method comprises storing one or more machine learning models and related metadata. The method also comprises receiving an enhanced service request token from a network function service consumer, NFc. The method also comprises validating the enhanced service request token based on the metadata related to the one or more machine learning models. The method also comprises, in response to validating the enhanced service request token, transmitting model information to the NFc. In some embodiments, in response to validating the enhanced service request token, the method also comprises updating the metadata with NFc information related to the NFc.

In some embodiments, transmitting model information to the NFc comprises transmitting a uniform resource identifier, URI, for downloading the one or more machine learning models.

In some embodiments, the method also comprises receiving a model download request from the NFc. In some embodiments, the method also comprises validating the model download request based on the NFc information stored in the updated metadata. In some embodiments, the method also comprises, in response to validating the model download request, transmitting the one or more machine learning models to the NFc.

In some embodiments, the method also comprises determining whether the enhanced service request token is valid based on a token expiration time.

In some embodiments, the method also comprises determining whether the NFc is authorized to retrieve the one or more machine learning models based on a token expiration time associated with an interval of time for downloading the one or more machine learning models.

In some embodiments, the method also comprises training the one or more machine learning models via a model training logical function, MTLF.

In some embodiments, the method also comprises registering respective metadata for the one or more machine learning models in a network function, NF, profile for the NFc.

In some embodiments, the method also comprises receiving credential information from a network function service consumer, NFc. In some embodiments the method also comprises comparing the credential information to the metadata related to the one or more machine learning models.

In another example embodiment, an apparatus includes processing circuitry and at least one memory including computer program code instructions that are configured to, when executed by the processing circuitry, cause the apparatus to store one or more machine learning models and related metadata. In some embodiments, the computer program code instructions are also configured to, when executed by the processing circuitry, cause the apparatus to receive an enhanced service request token from a network function service consumer, NFc. In some embodiments, the computer program code instructions are also configured to, when executed by the processing circuitry, cause the apparatus to validate the enhanced service request token based on the metadata related to the one or more machine learning models. In some embodiments, the computer program code instructions are also configured to, when executed by the processing circuitry, cause the apparatus to, in response to validating the enhanced service request token, transmit model information to the NFc. In some embodiments, the computer program code instructions are also configured to, when executed by the processing circuitry, cause the apparatus to, in response to validating the enhanced service request token, update the metadata with NFc information related to the NFc.

In some embodiments, the computer program code instructions are also configured to, when executed by the processing circuitry, cause the apparatus to receive a model download request from the NFc. In some embodiments, the computer program code instructions are also configured to, when executed by the processing circuitry, cause the apparatus to validate the model download request based on the NFc information stored in the updated metadata. In some embodiments, the computer program code instructions are also configured to, when executed by the processing circuitry, cause the apparatus to, in response to validating the model download request, transmit the one or more machine learning models to the NFc.

In some embodiments, the computer program code instructions are also configured to, when executed by the processing circuitry, cause the apparatus to transmit URI for downloading the one or more machine learning models.

In some embodiments, the computer program code instructions are also configured to, when executed by the processing circuitry, cause the apparatus to determine whether the enhanced service request token is valid based on a token expiration time.

In some embodiments, the computer program code instructions are also configured to, when executed by the processing circuitry, cause the apparatus to determine whether the NFc is authorized to retrieve the one or more machine learning models based on a token expiration time associated with an interval of time for downloading the one or more machine learning models.

In some embodiments, the computer program code instructions are also configured to, when executed by the processing circuitry, cause the apparatus to train the one or more machine learning models via a model training logical function, MTLF.

In some embodiments, the computer program code instructions are also configured to, when executed by the processing circuitry, cause the apparatus to register respective metadata for the one or more machine learning models in a network function, NF, profile for the NFc based on the model identifier.

In some embodiments, the computer program code instructions are also configured to, when executed by the processing circuitry, cause the apparatus to receive credential information from a network function service consumer, NFc. In some embodiments the computer program code instructions are also configured to, when executed by the processing circuitry, cause the apparatus to compare the credential information to the metadata related to the one or more machine learning models.

In another example embodiment, a computer program product is provided. The computer program product includes at least one non-transitory computer readable storage medium having computer-executable program code instructions stored therein with the computer-executable program code instructions including program code instructions configured, upon execution, to store one or more machine learning models and related metadata. In some embodiments, the computer-executable program code instructions are also configured to receive an enhanced service request token from a network function service consumer, NFc. In some embodiments, the computer-executable program code instructions are also configured to validate the enhanced service request token based on the metadata related to the one or more machine learning models. In some embodiments, the computer-executable program code instructions are also configured to, in response to validating the enhanced service request token, transmit model information to the NFc. In some embodiments, the computer-executable program code instructions are also configured to, in response to validating the enhanced service request token, update the metadata with NFc information related to the NFc.

In yet another example embodiment, an apparatus is provided that includes means for storing one or more machine learning models and related metadata. In some embodiments, the apparatus of this example embodiment also includes means for receiving an enhanced service request token from a network function service consumer, NFc. In some embodiments, the apparatus of this example embodiment also includes means for validating the enhanced service request token based on the metadata related to the one or more machine learning models. In some embodiments, the apparatus of this example embodiment also includes, in response to validating the enhanced service request token, means for transmitting model information to the NFc. In some embodiments, in response to validating the enhanced service request token, the apparatus of this example embodiment also includes means for updating the metadata with NFc information related to the NFc.

BRIEF DESCRIPTION OF THE DRAWINGS

Figure 1:
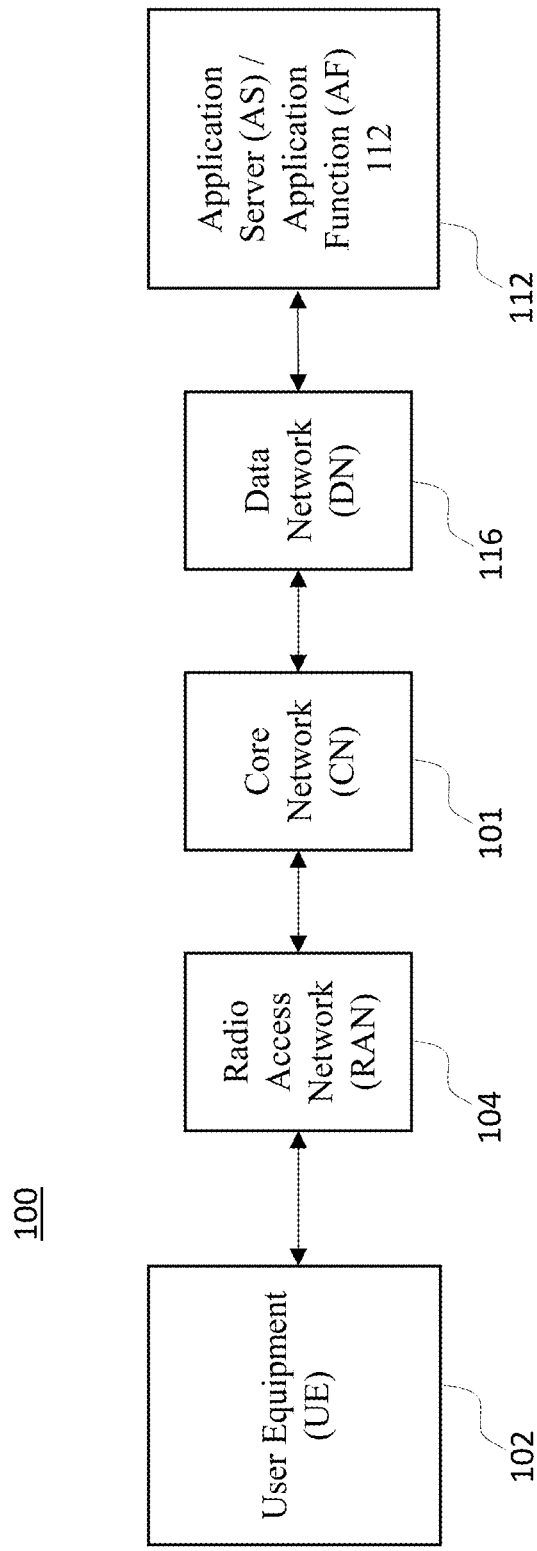
Figure 2:
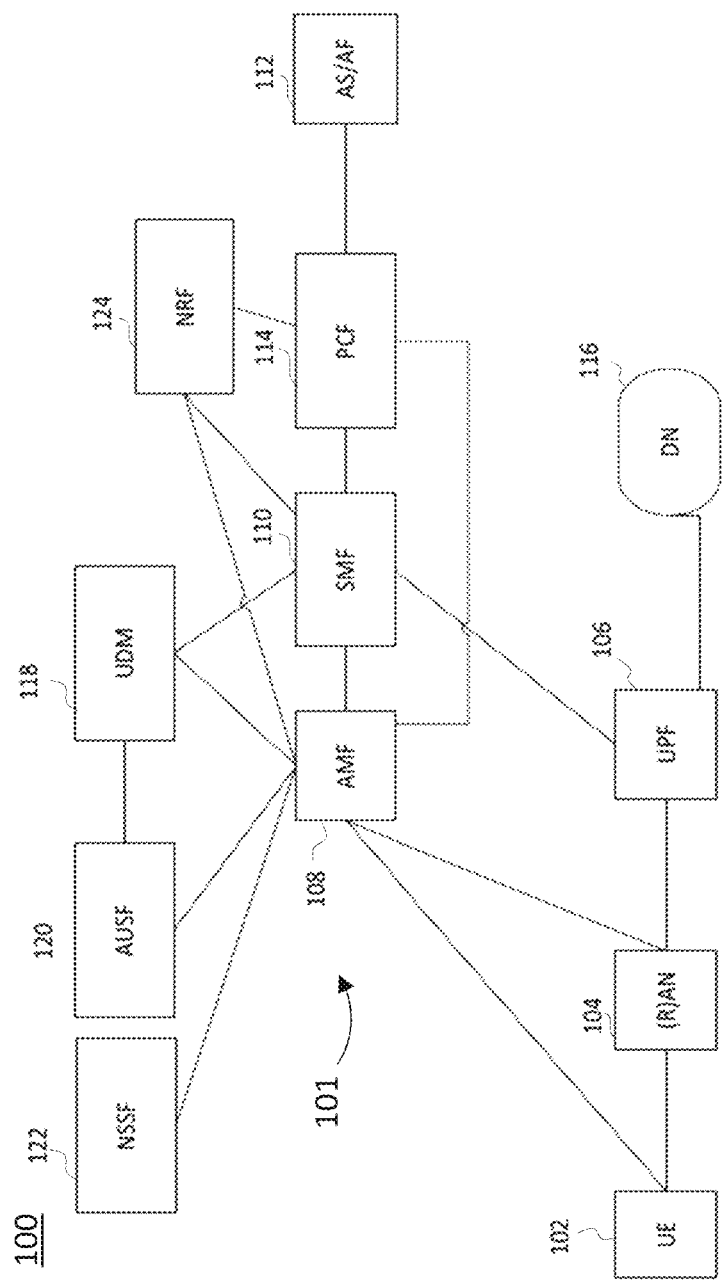
Figure 3:
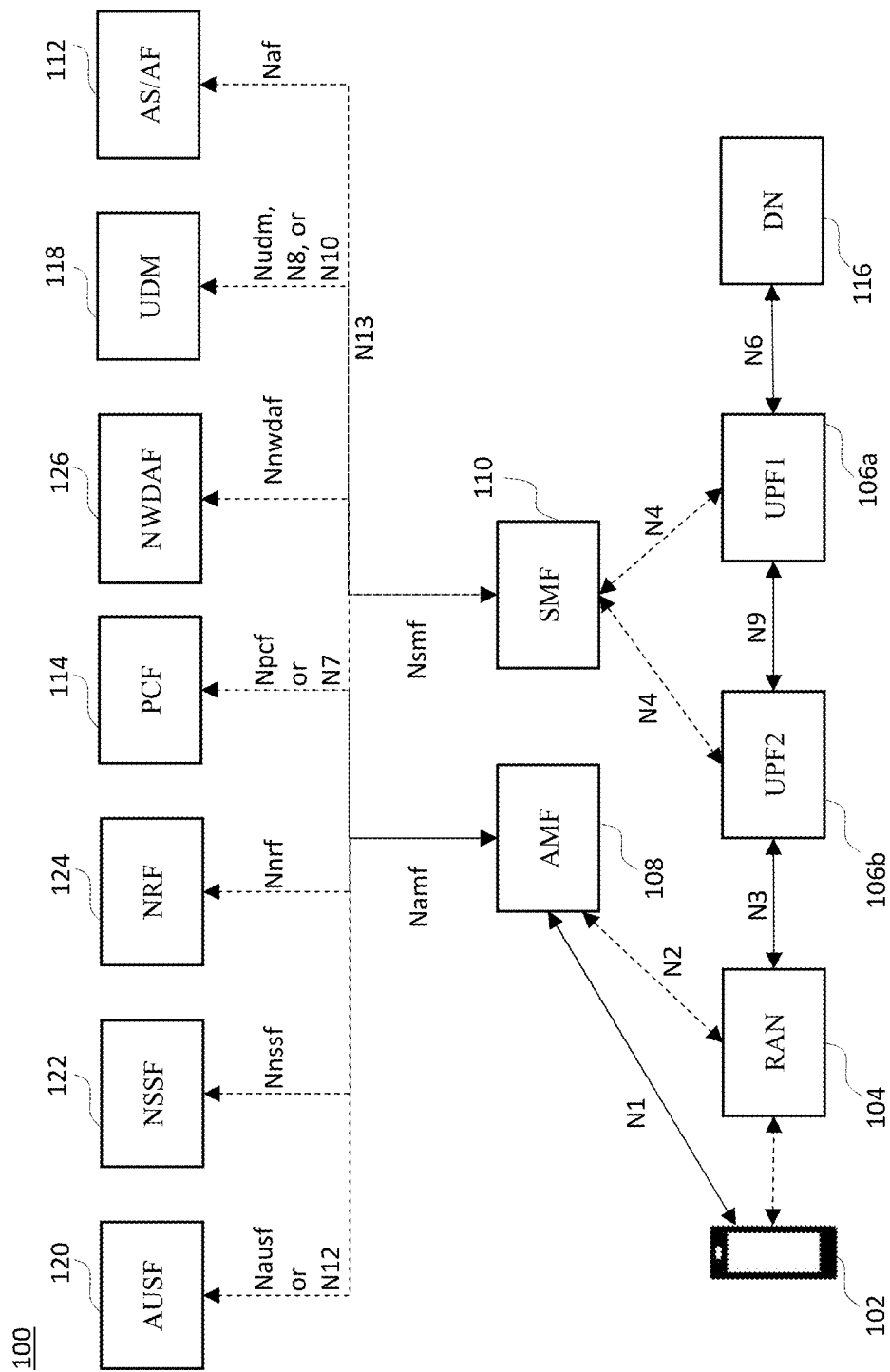
Figure 4:
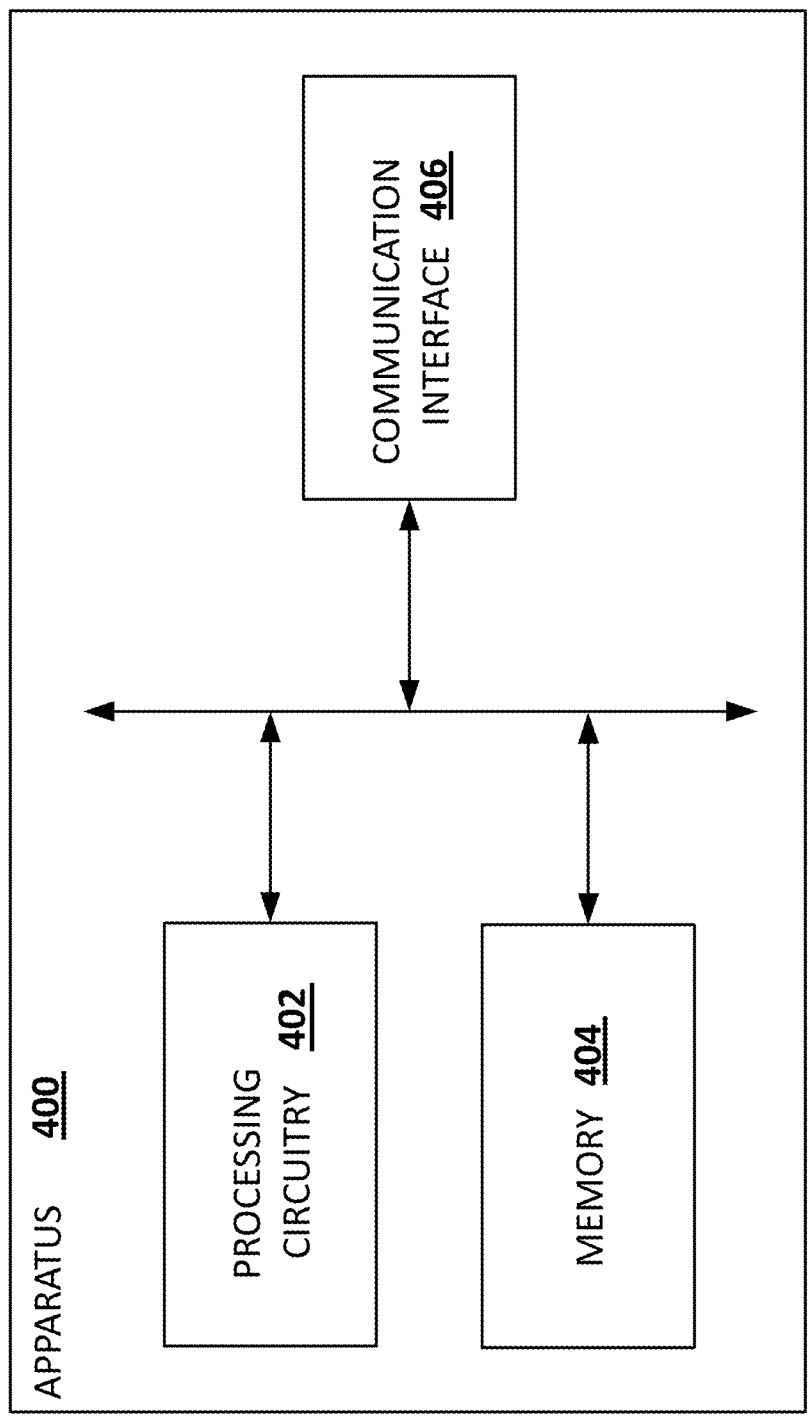
Figure 5:
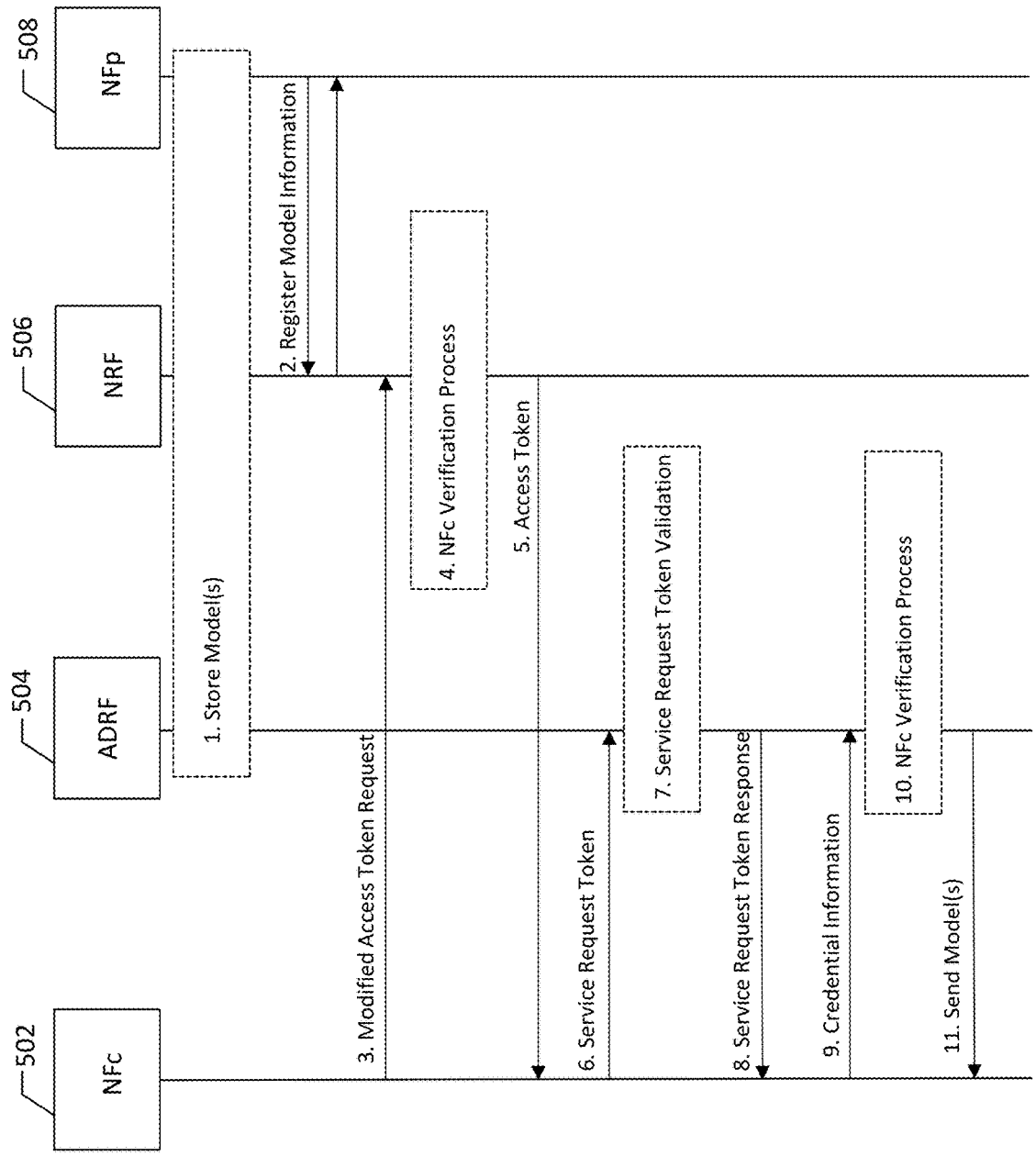
Figure 6:
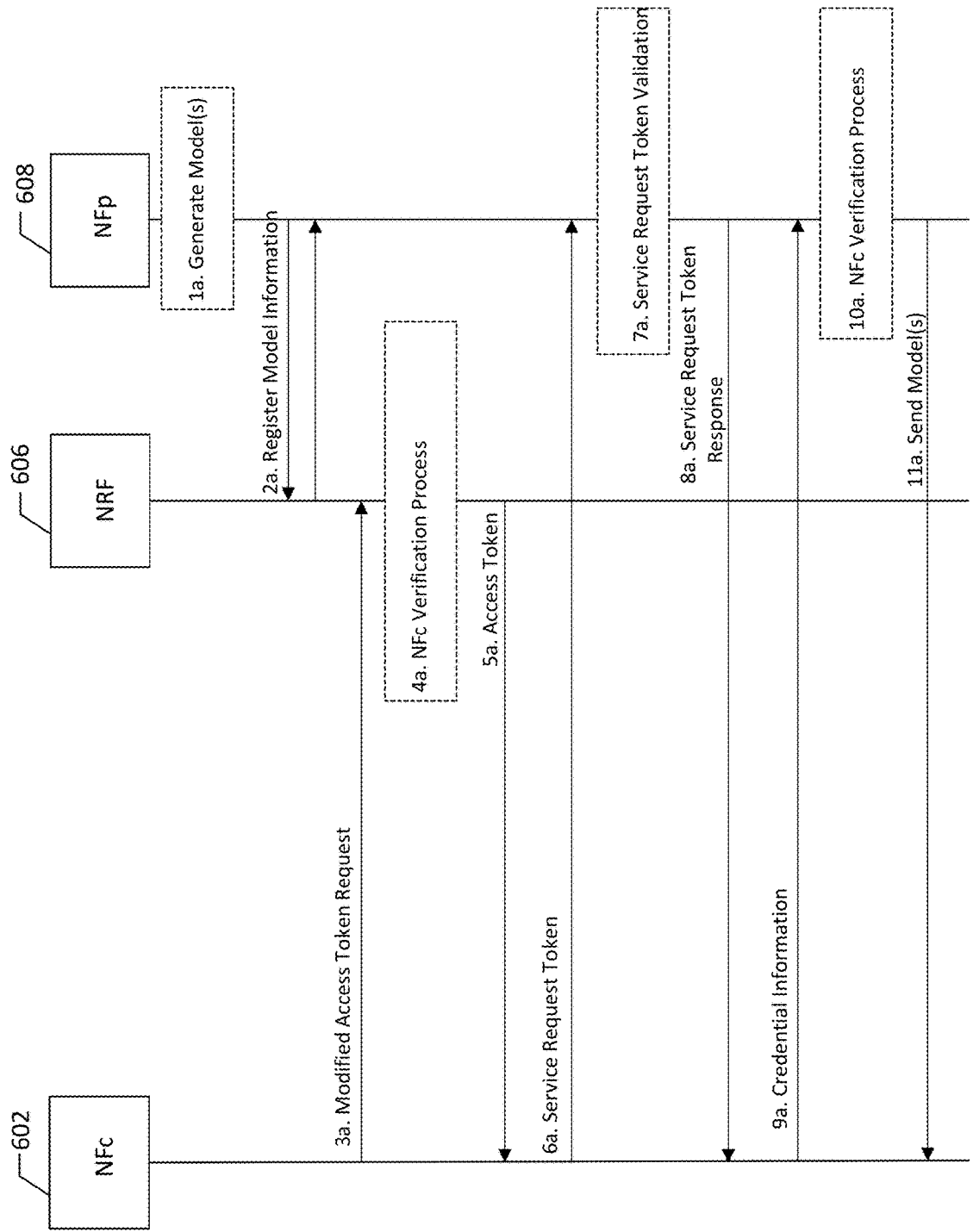
Figure 9:
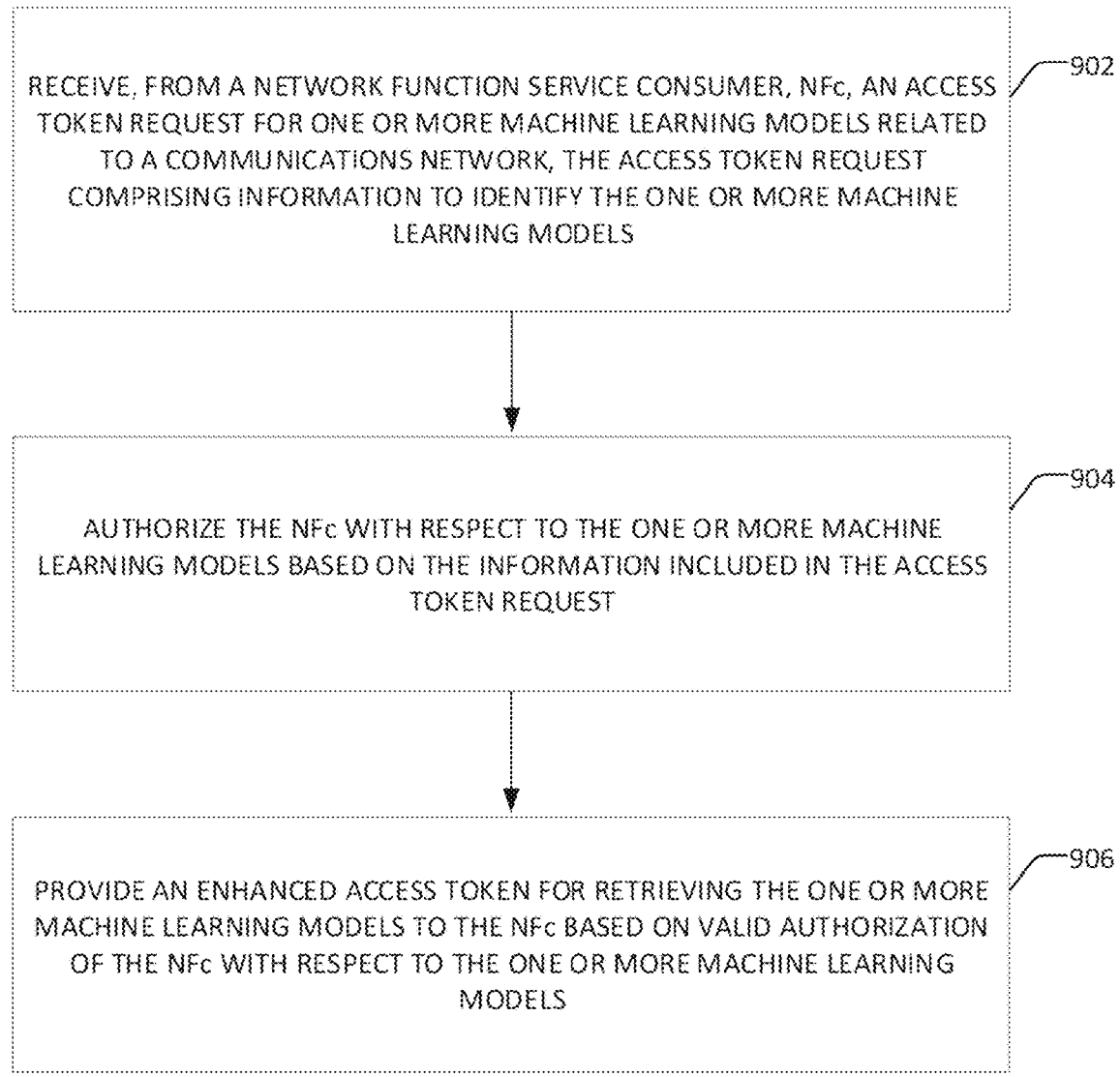
Figure 10:
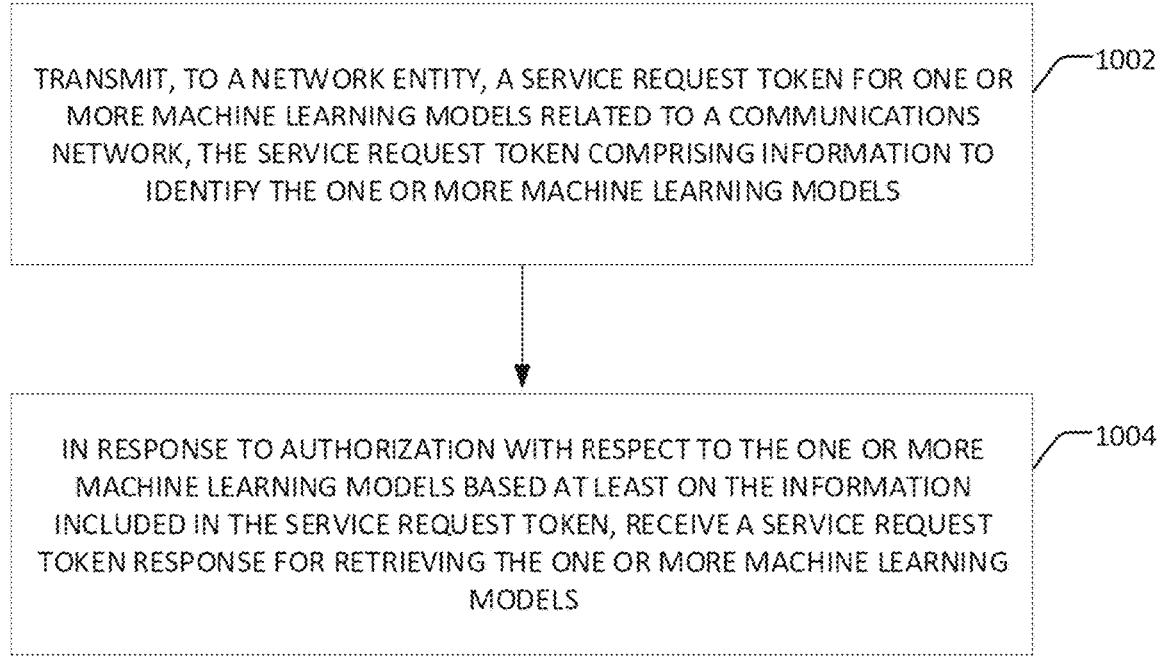
Figure 11:
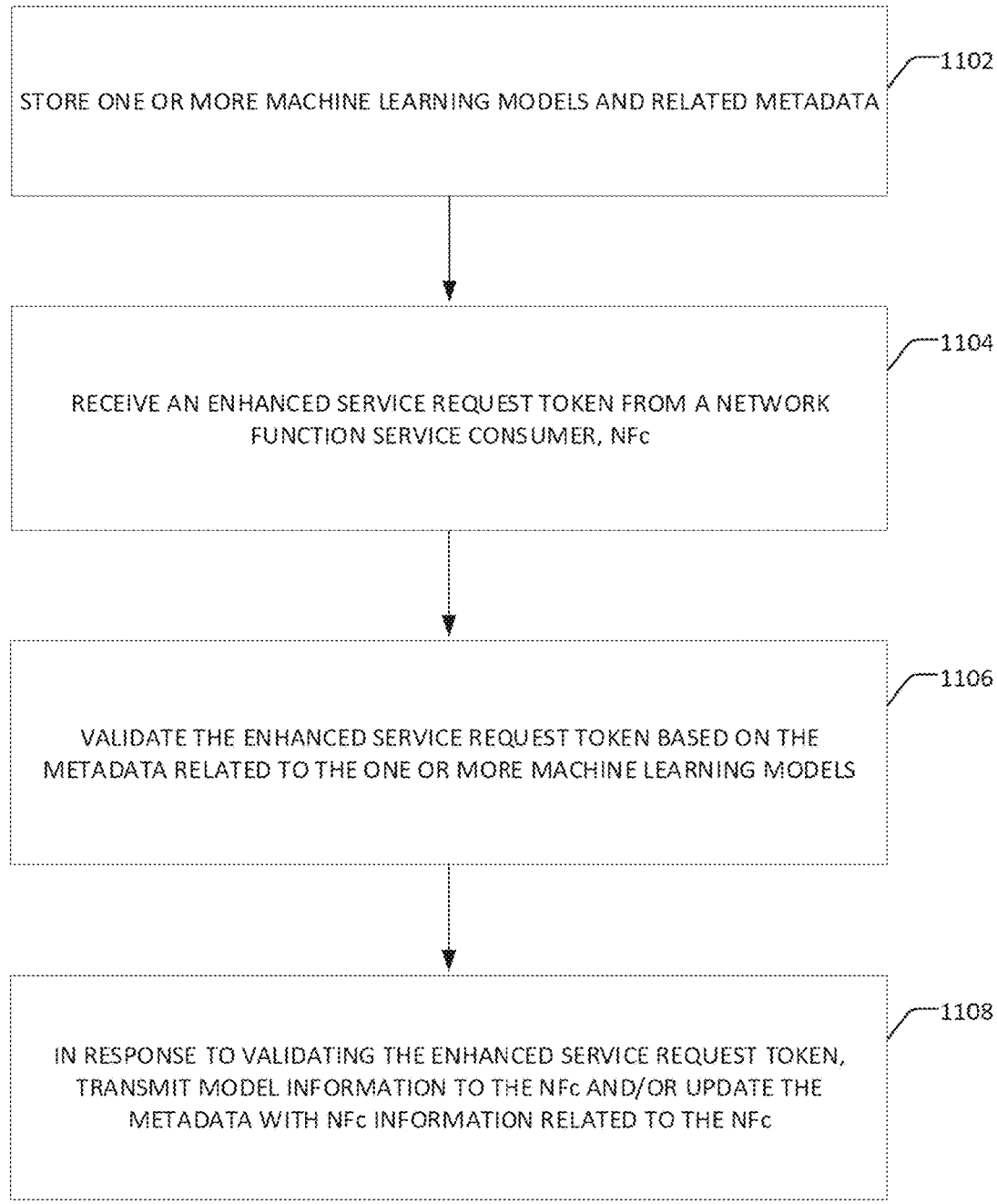

Having thus described certain example embodiments of the invention in general terms, reference will now be made to the accompanying drawings, which are not necessarily drawn to scale, and wherein:

FIG. 1 depicts an example architecture for a communications network in accordance with one or more example embodiments of the present disclosure;

FIG. 2 depicts another example architecture for a communications network in accordance with one or more example embodiments of the present disclosure;

FIG. 3 depicts yet another example architecture for a communications network in accordance with one or more example embodiments of the present disclosure;

FIG. 4 is a block diagram of an apparatus configured in accordance with one or more example embodiments of the present disclosure;

FIG. 5 illustrates example transmissions between a network function service consumer (NFc), an Analytics Data Repository Function (ADRF), a Network Repository Function (NRF), and/or a network service producer (NFp) in accordance with one or more example embodiments of the present disclosure;

FIG. 6 illustrates example transmissions between an NFc, an NRF, and/or an NFp in accordance with one or more example embodiments of the present disclosure;

FIG. 7 illustrates example attribute list included in an access token request in accordance with one or more example embodiments of the present disclosure;

FIG. 8 illustrates an example attribute list included in an access token in accordance with one or more example embodiments of the present disclosure;

FIG. 9 illustrates a flowchart illustrating operations performed, such as by the apparatus of FIG. 4, in order to provide for authorized machine learning model retrieval for a communications network, in accordance with one or more example embodiments of the present disclosure;

FIG. 10 illustrates a flowchart illustrating other operations performed, such as by the apparatus of FIG. 4, in order to provide for authorized machine learning model retrieval for a communications network, in accordance with one or more example embodiments of the present disclosure; and FIG. 11 illustrates a flowchart illustrating other operations performed, such as by the apparatus of FIG. 4, in order to provide for authorized machine learning model retrieval for a communications network, in accordance with one or more example embodiments of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) 5th generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions. Additionally, next generation systems which utilize the 5G architecture have been designed as a Service Based Architecture (SBA), e.g., a system architecture in which the system functionality is achieved by a set of Network Functions (NFs) providing services to other authorized NFs to access their services. The 5G network allows for the support of NFs via a Network Repository Function (NRF). For example, an NRF can maintain a list of available NFs to facilitate service registration and/or discovery in an instance in which a user equipment (UE) attempts to access one or more services provided by one or more network devices.

Certain embodiments will be illustrated herein in conjunction with example communication systems and associated techniques for authorized machine learning model retrieval for a communications network. It should be understood, however, that the scope of the claims is not limited to particular types of communication systems and/or processes disclosed. An example embodiment can be implemented in a terminal device (e.g., a user equipment) or a network (e.g., a communication network) of a communication system, using alternative processes and operations. For example, although illustrated in the context of wireless cellular systems utilizing 3GPP system elements such as a 3GPP next generation core network, the disclosed embodiments can be adapted in a straightforward manner to a variety of other types of communication systems. Additionally, while the present disclosure may describe certain embodiments in conjunction with a 5G communications system, other embodiments also apply to and comprise other networks and network technologies, such as 3G, 4G, Long Term Evolution (LTE), 6G, etc. without limitation.

Some embodiments herein make specific reference to hypertext transfer protocol (HTTP), however, other embodiments contemplate that alternative protocols can be used. For example, some alternative protocols are hypertext transfer protocol secure (HTTPS), HTTP/2, HTTP/3, quick user datagram protocol internet connection (QUIC), software package data exchange (SPDY), Gopher protocol, file transfer protocol (FTP), secure file transfer protocol (SFTP), file transfer protocol with explicit SSL (FTPES), secure copy protocol (SCP), internet application protocol (IAP), and similarly known technologies understood by one skilled in the art in light of the present disclosure. An example embodiment further contemplates that the methods, apparatuses, and computer program products described herein can also be applicable for use with a variety of network standards and communication protocols including those that have been developed and those which have yet to be developed.

In accordance with illustrative embodiments implemented in a 5G communication system environment, one or more 3GPP technical specifications (TS) and technical reports (TR) provide further explanation of user equipment and core network elements/entities/functions and/or operations performed by the user equipment and the core network elements/entities/functions, e.g., the 3GPP TS 33.501, the 3GPP TR 23.700-91, 3GPP TR 23.700-81. Other 3GPP TS/TR documents provide other conventional details that one of ordinary skill in the art will realize. However, while illustrative embodiments are well-suited for implementation associated with the above-mentioned 3GPP standards for 5G NR, alternative embodiments are not necessarily intended to be limited to any particular standards.

In a communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or a user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

To facilitate a communication session, network data analytics services can be provided via a communication system. For example, multiple network data analytics functions (NWDAFs) can be deployed (e.g., in a public land mobile network (PLMN) or wireless local area network (WLAN) to provide analytics data for data consumers. However, network data analytics services can often be inefficient and/or often results in data consumers not receiving data for some analytics identifications or areas of interest, among other deficiencies. Additionally or alternatively, certain communication systems, can employ one or more machine learning models that interact with NWDAFs to facilitate network data analytics services. However, with current communication systems, multiple security issues exist with respect to authorized machine learning model retrieval by an NWDAF. For example, an authorization schema for machine learning model retrieval is currently not defined in 3GPP. In addition, with current communication systems, a network entity that stores machine learning models, cannot verify whether a consumer is authorized to retrieve the machine learning models. Moreover, with current communication systems, transfer of machine learning models is not possible via certain network interfaces such as, for example, Service Based Interfaces (SBI), since the size of machine learning model is generally too large for transferring within the communication system.

As such, described herein are methods, apparatuses, and computer program products for authorized machine learning model retrieval for a communications network to resolve some or all of the described limitations of current communication networks and/or current network protocols. In various embodiments, an authorization schema is defined for retrieval of machine learning models in a communications system (e.g., a 5G system, etc.) based on one or more authorization protocols. In certain embodiments, the one or more authorization protocols can include an open authorization protocol (e.g., OAuth 2.0, etc.). In various embodiments, a model identifier (e.g., a machine learning model identifier) can be incorporated into the one or more authorization protocols. For instance, a model identifier can be incorporated into an NF profile. Additionally or alternatively, a model identifier can be incorporated into an access token request related to authentication between an NF and an NRF. As such, a communication system can authorize an NF service (e.g., an NF service consumer (NFc), etc.) based on the model identifier. In various embodiments, one or more machine learning models can be stored in an Analytics Data Repository Function (ADRF). Additionally or alternatively, one or more machine learning models can be retrieved directly from an NF service producer (NFp). The NFp can be an NWDAF such as, for example, an NWDAF model training logical function (MTLF). In certain embodiments, the one or more machine learning models can related to network data analytics. However, it is to be appreciated that the one or more machine learning models can additionally or alternatively be configured for one or more other purposes associated with the communication system.

By providing authorized machine learning model retrieval for a communications network, it is possible to improve security and/or performance of the communications network. Additionally, by providing authorized machine learning model retrieval for a communications network, improved network data analytics functions for communication sessions can also be provided. Moreover, by providing authorized machine learning model retrieval for a communications network, it is possible to minimize signaling load and/or reduce bandwidth being dedicated to such signaling, registration/deregistration, and/or other such activities. Accordingly, performance of a communication network can be improved.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment (UE) 102 and a Data Network (DN) 116 via a Core Network (CN) 101 of the communications network 100. The UE 102 can be associated with one or more devices associated with one or more NF service consumers. As illustrated in FIG. 1, a communications network 100 can be provided in which the UE 102 is in operable communication with the Radio Access Network (RAN) 104, such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, and/or the like. In some embodiments, the DN 116 or the CN 101 can be in communication with an Application Server (AS) or Application Function (AF) 112. The RAN 104, CN 101, DN 116, and/or AS/AF 112 can be associated with a Network Repository Function (NRF), Network Function (NF) service producer, Secure Copy Protocol (SCP), Security Edge Protection Proxy (SEPP), Policy Charging Function (PCF), the like, or any combination thereof.

In some embodiments, the core network 101 of the communications network 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), PCF, Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function (AMF) 108. In other instances or embodiments, the UE 102 can communicate directly with the AMF 108. In some embodiments, the AMF 108 can be in communication with one or more network functions (NFs), such as an Authentication Server Function (AUSF) 120, a Network Slice Selection Function (NSSF) 122, a Network Repository Function (NRF) 124, a Policy Charging Function (PCF) 114, a Network Data Analytics Function (NWDAF) 126, a Unified Data Management (UDM) 118, the AS/AF 112, a Session Management Function (SMF) 110, and/or the like.

In some embodiments, the SMF 110 can be in communication with one or more User Plane Functions 106 (UPF 106, UPF 106*a*, UPF 106*b*, collectively "UPF 106"). By way of example only, in some embodiments, the UPF 106 can be in communication with the RAN 104 and the DN 116. In other embodiments, the DN 116 can be in communication with a first UPF 106*a* and the RAN 104 can be in communication with a second UPF 106*b*, while the SMF 110 is in communication with both the first and second UPFs 106*a, b* and the first and second UPFs 106*a, b* are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence, Non-Orthogonal Multiple Access (NOMA), channel coding, and the like.

As illustrated in FIG. 3, the UE 102 can be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in an Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a 5th generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a 5th generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

In this regard, the implementation and/or allocation of authorized machine learning model retrieval within the communications network 100 can be accomplished by an apparatus 400 as depicted in FIG. 4. The apparatus 400 may be embodied by and/or incorporated into one or more UEs, such as user equipment 102, or any of the other devices discussed with respect to FIG. 1, such as core network 101, AMF 108, NWDAF 126, and/or devices that may be incorporated or otherwise associated with communications network 100. Alternatively, the apparatus 400 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

Regardless of the manner in which the apparatus 400 is embodied, the apparatus 400 of an example embodiment is configured to include or otherwise be in communication with a processing circuitry 402 and a memory 404. In some embodiments, the apparatus 400 is configured to additionally include or otherwise be in communication with a communication interface 406. In some embodiments, the processing circuitry 402 may be in communication with the memory 404 via a bus for passing information among components of the apparatus 400. The memory 404 may be non-transitory and may include, for example, one or more volatile and/or non-volatile memories. In other words, for example, the memory 404 may be an electronic storage device (e.g., a computer readable storage medium) comprising gates configured to store data (e.g., bits) that may be retrievable by a machine (e.g., a computing device like the processing circuitry 402). The memory 404 may be configured to store information, data, content, applications, instructions, or the like for enabling the apparatus 400 to carry out various functions in accordance with an example embodiment of the present disclosure. For example, the memory 404 could be configured to buffer input data for processing by the processing circuitry 402. Additionally or alternatively, the memory 404 could be configured to store instructions for execution by the processing circuitry 402.

As described above, the apparatus 400 may be embodied by a computing device. However, in some embodiments, the apparatus 400 may be embodied as a chip or chip set. In other words, the apparatus 400 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 400 may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 402 may be embodied in a number of different ways. For example, the processing circuitry 402 may be embodied as one or more of various hardware processing means including a processor, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 402 may include one or more processing cores configured to perform independently. A multi-core processor may enable multiprocessing within a single physical package. Additionally or alternatively, the processing circuitry 402 may include one or more processors configured in tandem via the bus to enable independent execution of instructions, pipelining and/or multithreading.

In an example embodiment, the processing circuitry 402 may be configured to execute instructions stored in the memory 404 or otherwise accessible to the processing circuitry 402. Alternatively or additionally, the processing circuitry 402 may be configured to execute hard coded functionality. As such, whether configured by hardware or software methods, or by a combination thereof, the processing circuitry 402 may represent an entity (e.g., physically embodied in circuitry) capable of performing operations according to an embodiment of the present disclosure while configured accordingly. Thus, for example, when the processing circuitry 402 is embodied as an ASIC, FPGA or the like, the processing circuitry 402 may be specifically configured hardware for conducting the operations described herein. Alternatively, as another example, when the processing circuitry 402 is embodied as an executor of software instructions, the instructions may specifically configure the processing circuitry 402 to perform the algorithms and/or operations described herein when the instructions are executed. However, in some cases, the processing circuitry 402 may be a processor of a specific device (e.g., a pass-through display or a mobile terminal) configured to employ an embodiment of the present disclosure by further configuration of the processing circuitry 402 by instructions for performing the algorithms and/or operations described herein. The processing circuitry 402 may include, among other things, a clock, an arithmetic logic unit (ALU) and logic gates configured to support operation of the processing circuitry 402.

The apparatus 400 may optionally include the communication interface 406. The communication interface 406 may be any means such as a device or circuitry embodied in either hardware or a combination of hardware and software that is configured to receive and/or transmit data from/to a network and/or any other device or module in communication with the apparatus. In this regard, the communication interface 406 may include, for example, an antenna (or multiple antennas) and supporting hardware and/or software for enabling communications with a wireless communication network. Additionally or alternatively, the communication interface 406 may include the circuitry for interacting with the antenna(s) to cause transmission of signals via the antenna(s) or to handle receipt of signals received via the antenna(s). In some environments, the communication interface 406 may alternatively or also support wired communication. As such, for example, the communication interface 406 may include a communication modem and/or other hardware/software for supporting communication via cable, digital subscriber line (DSL), universal serial bus (USB) or other mechanisms.

Provided hereinbelow, are example transmissions between one or more network entities or network functions (e.g., one or more network devices, one or more network components, etc.) related to communications network 100 such as, for example, an NFc, an ADRF, an NRF, and/or an NFp. The below example transmissions provide the foreseen functions or messaging needed.

In some embodiments, one or more network entities or network functions of a core network can be configured to store one or more models (e.g., one or more machine learning models) related to network data analytics in an ADRF.

FIG. 5 illustrates example transmissions between an NFc 502, an ADRF 504, an NRF 506, and/or an NFp 508 of a communication system for authorized machine learning model retrieval for the communication system, according to one or more embodiments. In one or more embodiments, the ADRF 504 can store one or more models, at 1. The one or more models can be one or more machine learning models. In certain embodiments, the one or more models can be one or more machine learning models related to network data analytics. However, it is to be appreciated that the one or more models can additionally or alternatively be configured for one or more other purposes associated with the communication system. In various embodiments, the NFp 508 can generate the one or more models. Furthermore, in various embodiments, the NFp 508 can store the one or more models in the ADRF 504. In some embodiments, the NFp 508 can train the one or more models via a model training logical function (e.g., NWDAF MTLF). The NFp 508 can additionally store the one or more models (e.g., the one or more trained models) in the ADRF 504. In some embodiments, the NFp 508 can append respective metadata to the one or more models. For example, the NFp 508 can additionally store respective metadata for the one or more models in the ADRF 504. The metadata for a respective model can contain one or more attributes related to the respective model, one or more NFs authorized to access the respective model, and/or one or more NFs restricted from accessing the respective model. For instance, the metadata can include a model identifier (e.g., Model ID) for the model, a model version (e.g., a machine learning model version) for the model, one or more analytics identifiers (e.g., analytics ID(s)) for one or more types of analytics supported by the model, an NF type for one or more NFs which can retrieve the model, an NF instance/NF set identifier for one or more NFs which can retrieve the model, an NF vendor identifier for one or more NFs which can retrieve the model, and/or one or more other attributes related to the model.

In one or more embodiments, the NFp 508 can register model information, at 2. For example, the NFp 508 can register the model information with the NRF 506. In certain embodiments, the NRF 506 can provide confirmation of the registration of the model information to the NFp 508. In some embodiments, NFp 508 can register the metadata for the one or more models in the NRF 506. For example, the metadata for the one or more models (e.g., the metadata included in the model information) can include one or more attributes related to the one or more models and/or one or more attributes for NFs that can be employed to limit access to the one or more models. In some embodiments, the NFp 508 can provide the model information (e.g., the metadata) in an NF profile registered with the NRF 506. For example, the NF profile can be configured to include one or more attributes related to the one or more models such as, for example, a model identifier (e.g., Model ID) for the one or more models, a model version (e.g., a machine learning model version) for the one or more models, one or more analytics identifiers (e.g., analytics ID(s)) for one or more types of analytics supported by the one or more models, and/or one or more other attributes related to the one or more models. Additionally or alternatively, the NF profile can be configured to include one or more attributes that can be employed to limit access to the one or more models such as, for example, an NF type for one or more NFs which can retrieve the one or more models, an NF instance/NF set identifier for one or more NFs which can retrieve the one or more models, an NF vendor identifier for one or more NFs which can retrieve the one or more models, and/or one or more other attributes related to an NF.

In one or more embodiments, the NFc 502 can send a modified access token request, at 3. For example, the NFc 502 can send the modified access token request to the NRF 506. The modified access token request can be an access token request that includes one or more attributes included in the model information. For example, the modified access token request can include a model identifier (e.g., Model ID), one or more analytics identifiers (e.g., analytics ID(s)), a model version (e.g., a machine learning model version), and/or an NF vendor identifier related to one or more requested models (e.g., one or more requested machine learning models). The one or more requested models can be one or more trained models stored in the ADRF 504. In certain embodiments, the NFc 502 and/or a SCP can employ the model information to request and/or retrieve additional access token authorizations to enable requesting a model (e.g., based on authorization information registered in the NRF 506 by the NFp 502) in a corresponding NF profile.

In one or more embodiments, the NRF 506 can perform an NFc verification process, at 4. For example, in response to receiving the modified access token request from the NFc 502, the NRF 506 can verify that the NFc 502 is authorized to retrieve the one or more models (e.g., the one or more models related to the one or more attributes in the modified access token request) from the ADRF 504. In one or more embodiments, the NRF 506 can employ the model identifier (e.g., Model ID), the one or more analytics identifiers (e.g., analytics ID(s)), the model version (e.g., a machine learning model version), and/or the NF vendor identifier included in the modified access token request to perform the access token request verification process. Additionally or alternatively, the NRF 506 can employ an NF type for one or more NFs which can retrieve the one or more models, an NF instance/NF set identifier for one or more NFs which can retrieve the one or more models, and/or an NF vendor identifier for one or more NFs which can retrieve the one or more models to perform the access token request verification process. In one or more embodiments, this information can be included in an NF profile for NFp 508 and/or can be stored by the NRF 506. In certain embodiments, the NRF 506 can determine that the NFp 508 comprises a profile containing the model identifier. Then, the NRF 506 can verify if, for the given NFp 508, the NFc 502 is allowed to consume the model associated with the model identifier.

In one or more embodiments, the NRF 506 can send an access token, at 5. For example, the NRF 506 can send the access token to the NFc 502 in response to successful verification (e.g., valid authorization) of the NFc 502 at 4. The access token can be an enhanced access token that includes a model identifier (e.g., Model ID), one or more analytics identifiers (e.g., analytics ID(s)), and/or a model version (e.g., a machine learning model version) for respective models authorized for retrieval by the NFc 502.

In one or more embodiments, the NFc 502 can send a service request token, at 6. For example, in response to receiving the access token from the NRF 506, the NFc 502 can send the service request token to the ADRF 504. The service request token can include the model identifier (e.g., Model ID), the one or more analytics identifiers (e.g., analytics ID(s)), and/or the model version (e.g., a machine learning model version) for the respective models authorized for retrieval by the NFc 502.

In one or more embodiments, the ADRF 504 can perform service request token validation, at 7. For example, the ADRF 504 can validate the service request token provided by the NFc 502. In some embodiments, the ADRF 504 can verify that the model identifier (e.g., Model ID), the one or more analytics identifiers (e.g., analytics ID(s)), and/or the model version (e.g., a machine learning model version) for the respective models authorized for retrieval by the NFc 502 match the respective metadata stored for the respective models in the ADRF 504. For example, the ADRF 504 can map the model identifier against model metadata generated by the NFp 508 (e.g., generated by NWDAF MTLF) during model storage to the ADRF 504. The ADRF 504 can then further compare whether the NFc 502 corresponds to an NFc included in a list of NFc types, NF instance/NF set identifiers, and/or vendor identifiers authorized to consume the model associated with the model identifier. In some embodiments, the ADRF 504 can additionally update the metadata stored in the ADRF 504 with NFc information for the NFc 502 that provided the service request token. The NFc information can include, for example, an NFc instance identifier, an NFc type, and/or other information associated with the NFc. In some embodiments, the ADRF 504 can additionally determine a token expiration time that can be employed to validate the authorization for a particular interval of time. For example, after the token expiration time, the NFc 502 will no longer be able to download the one or more models associated with the service request token.

In one or more embodiments, the ADRF 504 can send a service request token response, at 8. For example, the ADRF 504 can send the service request token response to the NFc 502 in response to successful validation (e.g., valid authorization) of the service request token. The service request token response may comprise, for example, a uniform resource identifier (URI) to retrieve the one or more models associated with the service request token.

In one or more embodiments, the NFc 502 can send credential information, at 9. For example, in response to receiving the service request token response from the ADRF 504, the NFc 502 can send the credential information to the ADRF 504. In various embodiments, the NFc 502 can send the credential information via a secure transfer protocol such as, for example, via client credentials assertion (CCA), via a certificate, or via another type of authentication technique. The credential information can include credentials for the NFc 502 to facilitate authorization of the NFc 502 to download the one or more models from the ADRF 504. The credential information can be information to facilitate identification of the NFc 502. For example, the credential information can include one or more NF identification attributes such as an NF instance/NF set identifier associated with the NFc 502, an NF vendor identifier associated with the NFc 502, and/or one or more other attributes associated with the NFc 502.

In one or more embodiments, the ADRF 504 can perform an NFc verification process, at 10. For example, in response to receiving the credential information from the NFc 502, the ADRF 504 can perform a secondary verification process (e.g., in addition to the NFc verification process performed by the NRF 506) to verify that the NFc 502 is authorized to download the one or more models from the ADRF 504. In various embodiments, the ADRF 504 can compare the credential information and/or the token expiration time to the respective metadata stored for the respective models in the ADRF 504 to determine whether the NFc 502 is authorized to download the one or more models from the ADRF 504.

In one or more embodiments, the ADRF 504 can send the one or more models, at 11. For example, in response to successful validation (e.g., valid authorization) of the NFc 502 based on the credential information, the ADRF 504 can send the one or more models (e.g., the one or more models requested for download by the NFc 502) to the NFc 502.

It is to be appreciated that, in certain embodiments, steps 6-8 and/or steps 9-11 illustrated in FIG. 5 can alternatively be performed via a single request/response interaction between the NFc 502 and the ADRF 504.

Provided hereinbelow, are other example transmissions between one or more network entities or network functions (e.g., one or more network devices, one or more network components, etc.) related to communications network 100 such as, for example, an NFc, an NRF, and/or an NFp. The below example transmissions provide the foreseen functions or mess aging needed.

In some embodiments, one or more network entities or network functions of a core network can be configured to store one or more models (e.g., one or more machine learning models) related to network data analytics in an NFp.

FIG. 6 illustrates example transmissions between an NFc 602, an NRF 606, and/or an NFp 608 of a communication system for authorized machine learning model retrieval for the communication system, according to one or more embodiments. In one or more embodiments, the NFp 608 can generate one or more models, at 1a. The one or more models can be one or more machine learning models. In certain embodiments, the one or more models can be related to network data analytics. However, it is to be appreciated that the one or more models can additionally or alternatively be configured for one or more other purposes related to a communications system. In some embodiments, the NFp 608 can train the one or more models via a model training logical function (e.g., NWDAF MTLF). In some embodiments, the NFp 608 can append respective metadata to the one or more models. For example, the NFp 608 can additionally generate respective metadata for the one or more models. The metadata for a respective model can contain one or more attributes related to the respective model, one or more NFs authorized to access the respective model, and/or one or more NFs restricted from accessing the respective model. For instance, the metadata can include a model identifier (e.g., Model ID) for the model, a model version (e.g., a machine learning model version) for the model, one or more analytics identifiers (e.g., analytics ID(s)) for one or more types of analytics supported by the model, an NF type for one or more NFs which can retrieve the model, an NF instance/NF set identifier for one or more NFs which can retrieve the model, an NF vendor identifier for one or more NFs which can retrieve the model, and/or one or more other attributes related to the model.

In one or more embodiments, the NFp 608 can register model information, at 2a. For example, the NFp 608 can register the model information with the NRF 606. In certain embodiments, the NRF 606 can provide confirmation of the registration of the model information to the NFp 608. In some embodiments, NFp 608 can register the metadata for the one or more models in the NFp 608. For example, the metadata for the one or more models (e.g., the metadata included in the model information) can include one or more attributes related to the one or more models and/or one or more attributes for NFs that can be employed to limit access to the one or more models. In some embodiments, the NFp 608 can provide the model information (e.g., the metadata) in an NF profile registered with the NRF 606. For example, the NF profile can be configured to include one or more attributes related to the one or more models such as, for example, a model identifier (e.g., Model ID) for the one or more models, a model version (e.g., a machine learning model version) for the one or more models, one or more analytics identifiers (e.g., analytics ID(s)) for one or more types of analytics supported by the one or more models, and/or one or more other attributes related to the one or more models. Additionally or alternatively, the NF profile can be configured to include one or more attributes that can be employed to limit access to the one or more models such as, for example, an NF type for one or more NFs which can retrieve the one or more models, an NF instance/NF set identifier for one or more NFs which can retrieve the one or more models, an NF vendor identifier for one or more NFs which can retrieve the one or more models, and/or one or more other attributes related to an NF.

In one or more embodiments, the NFc 602 can send a modified access token request, at 3a. For example, the NFc 602 can send the modified access token request to the NRF 606. The modified access token request can be an access token request that includes one or more attributes included in the model information. For example, the modified access token request can include a model identifier (e.g., Model ID), one or more analytics identifiers (e.g., analytics ID(s)), a model version (e.g., a machine learning model version), and/or an NF vendor identifier related to one or more requested models (e.g., one or more requested machine learning models). The one or more requested models can be one or more trained models stored by the NFp 608. In certain embodiments, the NFc 602 and/or a SCP can employ the model information to request and/or retrieve additional access token authorizations to enable requesting a model (e.g., based on authorization information registered in the NRF 606 by the NFp 602) in a corresponding NF profile.

In one or more embodiments, the NRF 606 can perform an NFc verification process, at 4a. For example, in response to receiving the modified access token request from the NFc 602, the NRF 606 can verify that the NFc 602 is authorized to retrieve the one or more models (e.g., the one or more models related to the one or more attributes in the modified access token) from the NFp 608. In one or more embodiments, the NRF 606 can employ the model identifier (e.g., Model ID), the one or more analytics identifiers (e.g., analytics ID(s)), the model version (e.g., a machine learning model version), and/or the NF vendor identifier included in the modified access token request to perform the access token request verification process. Additionally or alternatively, the NRF 606 can employ an NF type for one or more NFs which can retrieve the one or more models, an NF instance/NF set identifier for one or more NFs which can retrieve the one or more models, and/or an NF vendor identifier for one or more NFs which can retrieve the one or more models to perform the access token request verification process. In certain embodiments, the NRF 606 can determine that the NFp 608 comprises a profile containing the model identifier. Then, the NRF 606 can verify if, for the given NFp 608, the NFc 602 is allowed to consume the model associated with the model identifier.

In one or more embodiments, the NRF 606 can send an access token, at 5a. For example, the NRF 606 can send the access token to the NFc 602 in response to successful verification (e.g., valid authorization) of the NFc 602 at 4. The access token can be an enhanced access token that includes a model identifier (e.g., Model ID), one or more analytics identifiers (e.g., analytics ID(s)), and/or a model version (e.g., a machine learning model version) for respective models authorized for retrieval by the NFc 602.

In one or more embodiments, the NFc 602 can send a service request token, at 6a. For example, in response to receiving the access token from the NRF 506, the NFc 502 can send the service request token to the NFp 608. The service request token can include the model identifier (e.g., Model ID), the one or more analytics identifiers (e.g., analytics ID(s)), and/or the model version (e.g., a machine learning model version) for the respective models authorized for retrieval by the NFc 602.

In one or more embodiments, the NFp 608 can perform service request token validation, at 7a. For example, the NFp 608 can validate the service request token provided by the NFc 602. In some embodiments, the NFp 608 can verify that the model identifier (e.g., Model ID), the one or more analytics identifiers (e.g., analytics ID(s)), and/or the model version (e.g., a machine learning model version) for the respective models authorized for retrieval by the NFc 602 match the respective metadata stored for the respective models in the NFp 608. For example, the NFp 608 can map the model identifier against model metadata generated by the NFp 608 (e.g., generated by NWDAF MTLF) during model storage. The NFp 608 can then further compare whether the NFc 602 corresponds to an NFc included in a list of NFc types, NF instance/NF set identifiers, and/or vendor identifiers authorized to consume the model associated with the model identifier. In some embodiments, the NFp 608 can additionally update the metadata stored in the NFp 608 with NFc information for the NFc 602 that provided the service request token. The NFc information can include, for example, an NFc instance identifier, an NFc type, and/or other information associated with the NFc. In some embodiments, the NFp 608 can additionally determine a token expiration time that can be employed to validate the authorization for a particular interval of time. For example, after the token expiration time, the NFc 602 will no longer be able to download the one or more models associated with the service request token.

In one or more embodiments, the NFp 608 can send a service request token response, at 8a. For example, the NFp 608 can send the service request token response to the NFc 602 in response to successful validation (e.g., valid authorization) of the service request token. The service request token response can be, for example, a URI to retrieve the one or more models associated with the service request token.

In one or more embodiments, the NFc 602 can send credential information, at 9a. For example, in response to receiving the service request token response from the NFp 608, the NFc 602 can send the credential information to the NFp 608. In various embodiments, the NFc 602 can send the credential information via a secure transfer protocol such as, for example, via CCA, via a certificate, or via another type of authentication technique. The credential information can include credentials for the NFc 602 to facilitate authorization of the NFc 602 to download the one or more models from the NFp 608.

In one or more embodiments, the NFp 608 can perform an NFc verification process, at 10a. For example, in response to receiving the credential information from the NFc 602, the NFp 608 can perform a secondary verification process (e.g., in addition to the NFc verification process performed by the NRF 606) to verify that the NFc 602 is authorized to download the one or more models from the NFp 608. In various embodiments, the NFp 608 can compare the credential information and/or the token expiration time to the respective metadata stored for the respective models in the NFp 608 to determine whether the NFc 602 is authorized to download the one or more models from the NFp 608.

In one or more embodiments, the NFp 608 can send the one or more models, at 11a. For example, in response to successful validation (e.g., valid authorization) of the NFc 602 based on the credential information, the NFp 608 can send the one or more models (e.g., the one or more models requested for download by the NFc 602) to the NFc 602.

It is to be appreciated that, in certain embodiments, steps 6a-8a and/or steps 9a-11a illustrated in FIG. 6 can alternatively be performed via a single request/response interaction between the NFc 602 and the NFp 608.

FIG. 7 illustrates an example attribute list 700 included in an access token request, according to one or more embodiments. For example, the attribute list 700 can include attributes of an access token request such as, for example, a service operation. In certain embodiments, the attribute list 700 can correspond to one or more attributes included in the modified access token request sent by the NFc 502 (e.g., at 3) or the modified access token request sent by the NFc 602 (e.g., at 3a). In various embodiments, the attribute list 700 can be configured with an analytics ID 702, a model ID 704, and/or a model version 706. The analytics ID 702 can be an identifier for a particular type of analytics provided by an NFp and/or an identifier for a particular model that can be employed to provide the particular type of analytics. For example, the attribute list 700 can be configured with the analytics ID 702 in response to an NFc requesting access to a particular type of analytics, and/or a particular model that can be employed to provide the particular type of analytics, provided by an NFp and/or an ADRF. The model ID 704 can be an identifier for a particular model (e.g., a particular machine learning model) provided by an NFp and/or an ADRF. For example, the attribute list 700 can be configured with the model ID 704 in response to an NFc requesting access to a particular model. The model version 706 can correspond to a particular model version for a model provided by an NFp and/or an ADRF. For example, the attribute list 700 can be configured with the model version 706 in response to an NFc requesting access to a particular version of the model associated with the model ID 704. It is to be appreciated that, in certain embodiments, the attribute list 700 can additionally include one or more other attributes to facilitate access of one or more models by an NFc. For example, in certain embodiments, the attribute list 700 can additionally include one or more other attributes related to an access token as specified by 3GPP.

FIG. 8 illustrates an example attribute list 800 included in an access token, according to one or more embodiments. For example, the attribute list 800 can correspond to one or more attributes for the access token sent by the NRF 506 (e.g., at 5) or the access token sent by the NRF 606 (e.g., at 5a). In various embodiments, the attribute list 800 can be configured with a model ID 802 and/or an analytics ID 804. The model ID 802 can be an identifier for a particular model (e.g., a particular machine learning model) verified by an NRF for usage by an NFc. For example, the attribute list 800 can be configured with the model ID 802 in response to an NRF verifying that an NFc is authorized to retrieve a particular model which is hosted and/or provided by an NFp and/or an ADRF. The analytics ID 804 can be an identifier for a particular type of analytics, and/or a particular model that can be employed to provide the particular type of analytics, verified by an NRF for usage by an NFc. For example, the attribute list 800 can be configured with the analytics ID 804 in response to an NRF verifying that an NFc is authorized to retrieve a particular type of analytics, and/or a particular model that can be employed to provide the particular type of analytics, which is hosted and/or provided by an NFp and/or an ADRF. It is to be appreciated that, in certain embodiments, the attribute list 800 can additionally include one or more other attributes to facilitate access of one or more models by an NFc. For example, in certain embodiments, the attribute list 800 can additionally include one or more other attributes related to an access token as specified by 3GPP.

FIG. 9 illustrates a flowchart depicting a method 900 according to an example embodiment of the present disclosure. The operations of the method 900 are performed, such as by the apparatus 400 of FIG. 4, in order to provide for authorized machine learning model retrieval for a communications network are depicted, in accordance with one or more embodiments of the present disclosure. The apparatus 400 can be implemented, for example, by an ADRF (e.g., ADRF 504 or ADRF 604), an NRF (e.g., NRF 506 or NRF 606), an NFp (e.g., NFp 508 or NFp 608), and/or another type of network entity. As shown in block 902 of FIG. 9, the apparatus 400 includes means, such as the processing circuitry 402, the communication interface 406, or the like, configured to receive, from a network function service consumer, NFc, an access token request for one or more machine learning models related to a communications network, the access token request comprising information to identify the one or more machine learning models.

As shown in block 904 of FIG. 9, the apparatus 400 also includes means, such as the processing circuitry 402, the communication interface 406, or the like, configured to authorize the NFc with respect to the one or more machine learning models based on the information included in the access token request. In some embodiments, the apparatus is configured to authorize the NFc by determining whether the NFc is authorized to retrieve the machine learning model. In some embodiments, the apparatus is configured to authorize the NFc by authorizing the NFc based on credential information associated with the NFc. In some embodiments, the apparatus is configured to authorize the NFc by determining whether the NFc corresponds to a particular NFc included in a list of NFc types. In some embodiments, the apparatus is configured to authorize the NFc by determining whether the NFc is authorized to retrieve the machine learning model based on a token expiration time associated with an interval of time for downloading the machine learning model.

As shown in block 906 of FIG. 9, the apparatus 400 also includes means, such as the processing circuitry 402, the communication interface 406, or the like, configured to provide an enhanced access token for retrieving the one or more machine learning models to the NFc based on valid authorization of the NFc with respect to the one or more machine learning models.

In some embodiments, the information to identify the one or more machine learning models comprises at least a model identifier for the one or more machine learning models and the apparatus 400 includes means, such as the processing circuitry 402, the memory 404 or the like, configured to authorize the NFc with respect to the one or more machine learning models based at least on the model identifier.

In some embodiments, the information to identify the one or more machine learning models additionally or alternatively comprises at least a model version identifier for the one or more machine learning models and the apparatus 400 includes means, such as the processing circuitry 402, the memory 404 or the like, configured to additionally or alternatively authorize the NFc with respect to the one or more machine learning models based at least on the model version identifier.

In some embodiments, the information to identify the one or more machine learning models additionally or alternatively comprises at least an analytics identifier for a type of analytics supported by the one or more machine learning models and the apparatus 400 includes means, such as the processing circuitry 402, the memory 404 or the like, configured to additionally or alternatively authorize the NFc with respect to the one or more machine learning models based at least on the analytics identifier.

In some embodiments, the information to identify the one or more machine learning models additionally or alternatively comprises at least at least an NF type for one or more NFs authorized to retrieve the one or more models and the apparatus 400 includes means, such as the processing circuitry 402, the memory 404 or the like, configured to additionally or alternatively authorize the NFc with respect to the one or more machine learning models based at least on the NF type.

In some embodiments, the information to identify the one or more machine learning models additionally or alternatively comprises at least at least an NF instance/NF set identifier for one or more NFs authorized to retrieve the one or more models and the apparatus 400 includes means, such as the processing circuitry 402, the memory 404 or the like, configured to additionally or alternatively authorize the NFc with respect to the one or more machine learning models based at least on the NF instance/NF set identifier.

In some embodiments, the information to identify the one or more machine learning models additionally or alternatively comprises at least an NF vendor identifier for one or more NFs authorized to retrieve the one or more models and the apparatus 400 includes means, such as the processing circuitry 402, the memory 404 or the like, configured to additionally or alternatively authorize the NFc with respect to the one or more machine learning models based at least on the NF vendor identifier.

In some embodiments, the apparatus 400 further comprises means, such as the processing circuitry 402 or the like, configured to register respective metadata for the one or more machine learning models in a network function, NF, profile for the NFc.

In some embodiments, the apparatus 400 further comprises means, such as the processing circuitry 402, the communication interface 406 or the like, configured to configure the access token with one or more machine learning model identifiers in response to the valid authorization of the NFc with respect to the one or more machine learning models.

In some embodiments, the apparatus 400 further comprises means, such as the processing circuitry 402, the communication interface 406 or the like, configured to authorize the NFc based on credential information associated with the NFc.

In some embodiments, the apparatus 400 further comprises means, such as the processing circuitry 402, the communication interface 406 or the like, configured to determine whether the NFc corresponds to a particular NFc included in a list of NFc types.

In some embodiments, the apparatus 400 further comprises means, such as the processing circuitry 402, the communication interface 406 or the like, configured to authorize the NFc based on a network function, NF, profile for the NFc that is stored in a Network Repository Function, NRF.

In some embodiments, the apparatus 400 further comprises means, such as the processing circuitry 402, the communication interface 406 or the like, configured to receive, from a network function service producer, NFp, a registration request associated with an updated network function, NF, profile for the NFc that comprises at least one of a model identifier for the one or more machine learning models, an analytics identifier for a type of analytics supported by the one or more machine learning models, an NF type for one or more NFs authorized to retrieve the one or more models, or an NF instance/NF set identifier for one or more NFs authorized to retrieve the one or more models.

In some embodiments, the access token request is an OAuth 2.0 access token request. In some embodiments, the enhanced access token is an enhanced OAuth 2.0 access token.

FIG. 10 illustrates a flowchart depicting a method 1000 according to an example embodiment of the present disclosure. The operations of the method 1000 are performed, such as by the apparatus 400 of FIG. 4, in order to provide for authorized machine learning model retrieval for a communications network are depicted, in accordance with one or more embodiments of the present disclosure. The apparatus 400 can be implemented, for example, by an NFc (e.g., NFc 502 or NFc 602) and/or another type of network function. As shown in block 1002 of FIG. 10, the apparatus 400 includes means, such as the processing circuitry 402, the communication interface 406, or the like, configured to transmit, to a network entity, a service request token for one or more machine learning models related to a communications network, the service request token comprising information to identify the one or more machine learning models.

As shown in block 1004 of FIG. 10, the apparatus 400 also includes means, such as the processing circuitry 402, the communication interface 406, or the like, configured to, in response to authorization with respect to the one or more machine learning models based at least on the information included in the service request token, receive a service request token response for retrieving the one or more machine learning models.

In some embodiments, the service request token response comprises a uniform resource identifier, URI, for retrieving the one or more machine learning models associated with the service request token.

In some embodiments, the network entity is an Analytics Data Repository Function, ADRF and the apparatus 400 further comprises means, such as the processing circuitry 402, the communication interface 406 or the like, configured to transmit the service request token to the ADRF and/or receive the service request token response from the ADRF.

In some embodiments, the network entity is a network function service producer, NFp and the apparatus 400 further comprises means, such as the processing circuitry 402, the communication interface 406 or the like, configured to transmit the service request token comprises transmitting the service request token to the NFp and/or receive the service request token response from the NFp.

In some embodiments, the information to identify the one or more machine learning models comprises at least a model identifier for the one or more machine learning models and the apparatus 400 further comprises means, such as the processing circuitry 402, the communication interface 406 or the like, configured to receive the service request token response in response to authorization with respect to the one or more machine learning models based at least on the model identifier.

In some embodiments, the information to identify the one or more machine learning models additionally or alternatively comprises a model version identifier for the one or more machine learning models and the apparatus 400 further comprises means, such as the processing circuitry 402, the communication interface 406 or the like, configured to additionally or alternatively receive the service request token response in response to authorization with respect to the one or more machine learning models based at least on the model version identifier.

In some embodiments, the information to identify the one or more machine learning models additionally or alternatively comprises an analytics identifier for a type of analytics supported by the one or more machine learning models and the apparatus 400 further comprises means, such as the processing circuitry 402, the communication interface 406 or the like, configured to additionally or alternatively receive the service request token response in response to authorization with respect to the one or more machine learning models based at least on the analytics identifier.

In some embodiments, the apparatus 400 also includes means, such as the processing circuitry 402, the memory 404 or the like, configured to retrieve the one or more machine learning models from an Analytics Data Repository Function, ADRF. In some embodiments, the apparatus 400 also includes means, such as the processing circuitry 402, the memory 404 or the like, configured to retrieve the one or more machine learning models from a network function service producer, NFp.

In some embodiments, the apparatus 400 also includes means, such as the processing circuitry 402, the memory 404 or the like, configured to transmit credential information associated with a network function service consumer, NFc, to the network entity or a different network entity.

FIG. 11 illustrates a flowchart depicting a method 1100 according to an example embodiment of the present disclosure. The operations of the method 1100 are performed, such as by the apparatus 400 of FIG. 4, in order to provide for authorized machine learning model retrieval for a communications network are depicted, in accordance with one or more embodiments of the present disclosure. The apparatus 400 can be implemented, for example, by an ADRF (e.g., ADRF 504) and/or an NFp (e.g., NFp 508 or NFp 608) and/or another type of network function. As shown in block 1102 of FIG. 11, the apparatus 400 includes means, such as the processing circuitry 402, the communication interface 406, or the like, configured to store one or more machine learning models and related metadata.

As shown in block 1104 of FIG. 11, the apparatus 400 also includes means, such as the processing circuitry 402, the communication interface 406, or the like, configured to receive an enhanced service request token from a network function service consumer, NFc.

As shown in block 1106 of FIG. 11, the apparatus 400 also includes means, such as the processing circuitry 402, the communication interface 406, or the like, configured to validate the enhanced service request token based on the metadata related to the one or more machine learning models.

As shown in block 1108 of FIG. 11, the apparatus 400 also includes means, such as the processing circuitry 402, the communication interface 406, or the like, configured to, in response to validating the enhanced service request token, transmit model information to the NFc and/or update the metadata with NFc information related to the NFc.

In some embodiments, the apparatus 400 also includes means, such as the processing circuitry 402, the memory 404 or the like, configured to transmit a uniform resource identifier, URI, for downloading the one or more machine learning models.

In some embodiments, the apparatus 400 also includes means, such as the processing circuitry 402, the memory 404 or the like, configured to receive a model download request from the NFc.

In some embodiments, the apparatus 400 also includes means, such as the processing circuitry 402, the memory 404 or the like, configured to validate the model download request based on the NFc information stored in the updated metadata.

In some embodiments, the apparatus 400 also includes means, such as the processing circuitry 402, the memory 404 or the like, configured to, in response to validating the model download request, transmit the one or more machine learning models to the NFc.

In some embodiments, the apparatus 400 also includes means, such as the processing circuitry 402, the memory 404 or the like, configured to determine whether the enhanced service request token is valid based on a token expiration time.

In some embodiments, the apparatus 400 also includes means, such as the processing circuitry 402, the memory 404 or the like, configured to determine whether the NFc is authorized to retrieve the one or more machine learning models based on a token expiration time associated with an interval of time for downloading the one or more machine learning models.

In some embodiments, the apparatus 400 also includes means, such as the processing circuitry 402, the memory 404 or the like, configured to train the one or more machine learning models via a model training logical function, MTLF.

In some embodiments, the apparatus 400 also includes means, such as the processing circuitry 402, the memory 404 or the like, configured to register respective metadata for the one or more machine learning models in a network function, NF, profile for the NFc.

In some embodiments, the apparatus 400 also includes means, such as the processing circuitry 402, the memory 404 or the like, configured to receive credential information from a network function service consumer, NFc. In some embodiments, the apparatus 400 also includes means, such as the processing circuitry 402, the memory 404 or the like, configured to compare the credential information to the metadata related to the one or more machine learning models.

As described above, FIGS. 9-11 are respective flowcharts of respective methods that can be carried out by, e.g., the apparatus 400, and/or according to a computer program product, according to example embodiments of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowchart of FIG. 5 or FIG. 6 or as part of the communications network 100 of FIGS. 1-3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 404 of the apparatus 400 employing an embodiment of the present disclosure and executed by the processing circuitry 402. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart(s).

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The expression "at least one of A or B" in this document means A, or B, or both A and B.

What is claimed is:

1. A method, comprising:
   receiving, from a network function service consumer, NFc, an access token request for one or more machine learning models related to a communications network, the access token request comprising information to identify the one or more machine learning models, the information to identify the one or more machine learning models further comprising at least an NF vendor identifier for one or more NFs authorized to retrieve the one or more models;
   authorizing the NFc with respect to the one or more machine learning models based on the information included in the access token request; and
   providing an enhanced access token for retrieving the one or more machine learning models to the NFc based on valid authorization of the NFc with respect to the one or more machine learning models.

2. The method of claim 1, the information to identify the one or more machine learning models further comprising at least a model version identifier for the one or more machine learning models.

3. The method of claim 1, the information to identify the one or more machine learning models further comprising at least an analytics identifier for a type of analytics supported by the one or more machine learning models.

4. The method of claim 1, the information to identify the one or more machine learning models further comprising at least an NF type for one or more NFs authorized to retrieve the one or more machine learning models.

5. The method of claim 1, the information to identify the one or more machine learning models further comprising at least an NF instance/NF set identifier for one or more NFs authorized to retrieve the one or more models.

6. The method of claim 1, the providing the access token comprising configuring the access token with one or more machine learning model identifiers in response to the valid authorization of the NFc with respect to the one or more machine learning models.

7. The method of claim 1, the authorizing the NFc further comprising authorizing the NFc based on credential information associated with the NFc.

8. The method of claim 1, the authorizing the NFc further comprising determining whether the NFc corresponds to a particular NFc included in a list of NFc types.

9. The method of claim 1, the authorizing the NFc further comprising authorizing the NFc based on a network function, NF, profile for the NFc that is stored in a Network Repository Function, NRF.

10. The method of claim 1, further comprising:
    receiving, from a network function service producer, NFp, a registration request associated with an updated network function, NF, profile for the NFc that comprises at least one of a model identifier for the one or more machine learning models, an analytics identifier for a type of analytics supported by the one or more machine learning models, an NF type for one or more NFs authorized to retrieve the one or more models, or an NF instance/NF set identifier for one or more NFs authorized to retrieve the one or more models.

11. The method of claim 1, wherein the access token request is an OAuth 2.0 access token.

12. The method of claim 1, wherein the enhanced access token is an OAuth 2.0 access token.

* * * * *